United States Patent
Nadakuditi et al.

(10) Patent No.: US 12,475,559 B2
(45) Date of Patent: Nov. 18, 2025

(54) MACHINE LEARNING APPROACH FOR CORONARY 3D RECONSTRUCTION FROM X-RAY ANGIOGRAPHY IMAGES

(71) Applicant: REGENTS OF THE UNIVERSITY OF MICHIGAN, Ann Arbor, MI (US)

(72) Inventors: Raj Rao Nadakuditi, Ann Arbor, MI (US); Brahmajee Kartik Nallamothu, Ann Arbor, MI (US); Carlos Alberto Figueroa-Alvarez, Ann Arbor, MI (US); Kritika Iyer, Ann Arbor, MI (US); Ismael Assi, Toledo, OH (US)

(73) Assignee: REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 235 days.

(21) Appl. No.: 18/320,156

(22) Filed: May 18, 2023

(65) Prior Publication Data
US 2024/0386547 A1    Nov. 21, 2024

(51) Int. Cl.
*G06T 7/00*    (2017.01)

(52) U.S. Cl.
CPC .. *G06T 7/0012* (2013.01); *G06T 2207/10081* (2013.01); *G06T 2207/10116* (2013.01);
(Continued)

(58) Field of Classification Search
CPC ......... G06T 7/0012; G06T 2207/10081; G06T 2207/10116; G06T 2207/20081;
(Continued)

(56) References Cited

U.S. PATENT DOCUMENTS

| | | |
|---|---|---|
| 8,406,860 B2 | 3/2013 | Dvorsky et al. |
| 8,831,304 B2 | 9/2014 | Xu et al. |

(Continued)

FOREIGN PATENT DOCUMENTS

| | | |
|---|---|---|
| CN | 108665449 A | 10/2018 |
| CN | 113628193 A | 11/2021 |

(Continued)

OTHER PUBLICATIONS

Iyer et al. "A multi-stage neural network approach for coronary 3D reconstruction from uncalibrated X-ray angiography images", Oct. 16, 2023; Scientific Reports 13, Article No. 17603 (Year: 2023).*

(Continued)

*Primary Examiner* — Siamak Harandi
(74) *Attorney, Agent, or Firm* — MARSHALL, GERSTEIN & BORUN LLP

(57) ABSTRACT

A method of performing 3D vessel tree reconstruction includes providing segmented binary angiography images, applying a distance transform to the images, and generating distance transformed binary angiography images. The set of distance transformed binary angiography images are provided to a trained 3D vessel reconstruction machine learning model capable of reconstructing 3D vessels. The 3D vessel tree reconstruction machine learning model includes a multi-stage convolutional neural network comprising a multi-stage architecture with (i) a vessel centerline stage, and (ii) a radius reconstruction stage. Resultant 3D reconstructed vessel trees may be used in performing clinical assessment of coronary vessel health, and occlusion.

20 Claims, 14 Drawing Sheets
(10 of 14 Drawing Sheet(s) Filed in Color)

(52) U.S. Cl.
CPC ............... *G06T 2207/20081* (2013.01); *G06T 2207/30104* (2013.01)

(58) Field of Classification Search
CPC . G06T 2207/30104; G06T 2207/20084; G06T 2207/30101; G06T 2207/30172
See application file for complete search history.

(56) References Cited

U.S. PATENT DOCUMENTS

| | | | |
|---|---|---|---|
| 8,977,339 | B1 | 3/2015 | Wu et al. |
| 10,249,048 | B1 | 4/2019 | Wang et al. |
| 11,599,996 | B2 | 3/2023 | Isgum et al. |
| 2007/0031019 | A1 | 2/2007 | Lesage et al. |
| 2010/0104160 | A1 | 4/2010 | Lavi et al. |
| 2010/0296709 | A1 | 11/2010 | Ostrovsky-Berman et al. |
| 2011/0081057 | A1 | 4/2011 | Zeng |
| 2012/0041318 | A1 | 2/2012 | Taylor |
| 2015/0112182 | A1 | 4/2015 | Sharma et al. |
| 2015/0282777 | A1 | 10/2015 | Compas et al. |
| 2015/0356753 | A1 | 12/2015 | Lauritsch et al. |
| 2016/0098531 | A1 | 4/2016 | Wu et al. |
| 2016/0155234 | A1 | 6/2016 | Kang et al. |
| 2016/0166209 | A1 | 6/2016 | Itu et al. |
| 2017/0105694 | A1 | 4/2017 | Grass et al. |
| 2017/0245821 | A1 | 8/2017 | Itu et al. |
| 2018/0310888 | A1 | 11/2018 | Itu et al. |
| 2019/0019286 | A1 | 1/2019 | Passerini et al. |
| 2019/0029519 | A1 | 1/2019 | Itu et al. |
| 2019/0150869 | A1 | 5/2019 | Passerini et al. |
| 2019/0318476 | A1 | 10/2019 | Isgum et al. |
| 2019/0362494 | A1 | 11/2019 | Wang et al. |
| 2021/0085397 | A1 | 3/2021 | Passerini et al. |
| 2021/0110543 | A1 | 4/2021 | Nickisch et al. |
| 2021/0118569 | A1 | 4/2021 | Grass et al. |
| 2021/0158541 | A1* | 5/2021 | Figueroa-Alvarez ........................ G06N 3/084 |
| 2021/0319558 | A1 | 10/2021 | Min et al. |
| 2023/0177677 | A1 | 6/2023 | Yuan et al. |
| 2023/0230231 | A1* | 7/2023 | Tu ........................ G06V 10/774 382/130 |
| 2023/0368398 | A1 | 11/2023 | Figueroa-Alvarez et al. |

FOREIGN PATENT DOCUMENTS

| | | |
|---|---|---|
| EP | 2693401 A1 | 2/2014 |
| WO | 2014/162273 A1 | 10/2014 |

OTHER PUBLICATIONS

Gao et al. "Vessel segmentation for X-ray coronary angiography using ensemble methods with deep learning and filter-based features"; 2022; BMC Medical Imaging (2022)22-10; pp. 1-17. (Year: 2022).*

Abbasi et al., Curvature scale space image in shape similarity retrieval, Multimedia Systems, 7:467-76 (1999).

Adjoua et al., Reduced-order modeling of hemodynamics across macroscopic through mesoscopic circulation scales, Cornell University Library, 19 pages (2019).

Adla et al.(NPL "Multimodality Imaging of Carotid Stenosis", International Journal of Angiology vol. 24, Mar. 2015, hereafter referred to as Adla).

Antiga, Generalizing vesselness with respect to dimensionality and shape, Release 1.00 (Aug. 3, 2007).

Banerjee et al., A graph theoretic framework for representation, exploration and analysis on computed states of physical systems, Computer Methods in Applied Mechanics and Engineer, 33 pages (2019).

Buades et al., A non-local algorithm for image denoising, IN: Computer Vision and Pattern Recognition, CVPR 2005, IEEE Computer Society Conference, vol. 2, pp. 60-65 (2005).

Cardiovascular Angiography Analysis System—CAAS, PIE Medical Imaging, Sectra, AB, downloaded from the Internet at: <https://www.sectra.com/medical/radiologyimaging/solutions/ris-pacs/add-ons/3rdpartyproviders/piemedical/index.html> (prior art).

Cerquerira et al., Standardized myocardial segmentation and nomenclature for tomographic imaging of the heart a statement for healthcare professionals from the cardiac imaging committee of the council on clinical cardiology of the American Heart Association, Circulation, 105(4):539-42 (2002).

Dijkstra, A note on two problems in connexion with graphs, Numerische Mathematik, 1:269-71 (1959).

Frangi et al., Multiscale vessel enhancement filtering, In: Wells et al. (eds.), Medical Image Computing and Computer-Assisted Interventation MICCA198, Lecture Notes in Computer Science, vol. 1496, pp. 130-137, Springer Verlag, Berlin, Germany (1998).

Fu et al., Rapid vessel segmentation and reconstruction of head and neck angiograms using 3D convolutional neural network, Nature Communications, 11(1): 1-12 (Jan. 2020).

Funka-Lea et al., Automatic heart isolation for CT coronary visualization using graph-cuts, 3rd IEEE International Symposium on Biomedical Imaging: Nano to Macro, pp. 614-617 (2006).

Golsin et al., Robust vessel tree modeling, Medical Image Computing and Computer-Assisted Intervention—MICCAI 2008, pp. 602-611, Springer (2008).

International Application No. PCT/US2023/067202, International Search Report and Written Opinion, mailed Dec. 11, 2023.

Iyer et al., AngioNet: a convolutional neural network for vessel segmentation in X-ray angiography, Scientific Reports, 11(18066):1-13 (Sep. 2021).

Kass et al., Snakes: Active Contour Models, International Journal of Computer Vision, 321-331 (1988).

Kelm et al., Detection, grading and classication of coronary stenoses in computed tomography angiography, Medical Image Computing and Computer-Assisted Intervention—MICCAI 2011, pp. 25-32, Springer (2011).

Kirbas et al., Vessel extraction techniques and algorithms: a survey, Proceedings of Third IEEE Symposium on Bioinformatics and Bioengineering, pp. 238-245 (2003).

Lorigo et al., Curves: Curve evolution for vessel segmentation, Med. Image Anal., 593):195-206 (2001).

Nain et al., Vessel segmentation using a shape driven flow, Medical Image Computing and Computer-Assisted Intervention—MICCAI 2004, pp. 51-59, Springer (2004).

Nasr-Esfahani et al., Segmentation of vessels in angiograms using convolutional neural networks, Biomedical Signal Processing and Control, 40:240-251 (2017).

Nikolaou et al., MRI and CT in the diagnosis of coronary artery disease: indications and applications, Insights Imaging, 2(1):9-24 (2011).

Patton et al., Retinal image analysis: concepts, applications and potential, Progress in Retinal and Eye Research, 25 (1):99-127 (2006).

Pham et al., Current methods in medical image segmentation, Annu. Rev. Biomed. Eng., 2:315-37 (2000).

Pizer et al., Adaptive histogram equalization and its variations, Computer Vision, Graphics, and Image Processing, 39:355-68 (1987).

Raissi et al., Hidden Fluid Mechanics: A Navier-Stokes Informed Deep Learning Framework for Assimilating Flow Visualization Data, ARXIV.org, Cornell University Library, 33 pages (2018).

Raissi et al., Physics Informed Deep Learning (Part I): Data-driven Solutions of Nonlinear Partial Differential Equations, ARXIV.org, Cornell University Library, 22 pages (2017).

Sankaran et al., Physics driven reduced order model for real time blood flow simulations, Cornell University Library, 22 pages (2019).

Suzuki et al., Acceleration of the poisson solver in incompressible CFO using convolutional neural network, 32nd Symposium on Numerical Fluid Dynamics (Dec. 2018).

Tomasello et al., Quantitative Coronary Angiography in the Interventional Cardiology, IN: Kirac (ed.), Advances in the Diagnosis of Coronary Atherosclerosis, InTech, pp. 255-273 (Nov. 2011).

(56) References Cited

OTHER PUBLICATIONS

Wesarg et al., Localizing calcifications in cardiac CT data sets using a new vessel segmentation approach, J. Digit. Imaging, 19(3):249-57 (2006).
What is Coronary Heart Disease, National Institutes of Health, National Heart, Lung, and Blood Institute (updated Jun. 22, 2016).
Yang et al., External force back-projective composition and globally deformable optimization for 3-D coronary artery reconstructions, Phys. Med. Biol. 59:975-1003 (2014).
Yang et al., Novel Approach for 3-D Reconstruction of Coronary Arteries From Two Uncalibrated Angiographic Images, IEEE Transactions on Image Processing, 18(7):1563-1572 (2009).
Zhao et al., Automated coronary tree segmentation for x-ray angiography sequences using fully- convolutional neural networks, 2018 IEEE Visual Communications and Image Processing (VCIP) <https://ieeexplore.IEEE.orQ/xpl/conhome/8694905/proceedinQ> (Dec. 2018).
Iyer et al., Abstract 12865: Data-Driven Approach for Coronary Vessel Reconstruction, Circulation, 140(Suppl_1): A12865-A12865 (Nov. 2019).
Au, Benjamin; Shaham, Uri; Dhruva, Sanket; Automated Characterization of Stenosis in Invasive Coronary Angiography Images with Convolutional Neural Networks; ARXIV ID: 1807.10597; Publication Date: Jul. 19, 2018 (Year: 2018).

\* cited by examiner

MACHINE LEARNING APPROACH FOR CORONARY 3D RECONSTRUCTION FROM X-RAY ANGIOGRAPHY IMAGES

FIELD OF THE DISCLOSURE

The invention generally relates to three-dimensional image reconstruction of objects, and specifically, to the three-dimensional reconstruction of coronary artery trees using angiography images and a multi-stage neural network machine learning model.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Three-dimensional (3D) reconstruction of structures and objects is widely used across a range of industries including materials research, city mapping, gaming, virtual environments, medicine, and medical research, among others. Each application of 3D reconstruction has its own difficulties and drawbacks. For example, city mapping may use satellite or drone footage which may lack a desired depth resolution to properly reconstruct smaller structures, or in gaming, the movement of a person or actor may be reconstructed in 3D, which has its own inherent difficulties.

Specifically, 3D reconstruction may be useful in developing physiological-based quantitative approaches for determining organ function, a state of blood vessel function, diagnosis of one or more diseases or disorders, or for monitoring organs and structures during a treatment, intervention or surgery. Coronary Artery Disease (CAD) is among the leading causes of death in the United States, affecting more than 15 million Americans. CAD is characterized by plaque build-up from atherosclerosis in the coronary arteries, which results in the narrowing (also known as stenosis) or blockage of coronary arteries and can lead to symptoms such as angina and possibly myocardial infarction.

Herein, 'state of vessel occlusion' refers to what is commonly understood as CAD, e.g., narrowing (localized or diffused) of the epicardial coronary arteries as seen in imaging studies and characterized by either anatomical or functional indices. Conversely, 'state of microvascular disease' refers to disease in the coronary microcirculation, characterized by the loss of vasodilatory capacity.

The leading invasive diagnostic method for CAD is coronary angiography, in which a contrast agent is injected into a patient's vessels via a catheter and imaged to characterize stenosis severity. This method relies on visualization of anatomic abnormalities and is semi-quantitative, as visual inspection simply approximates the percent area reduction of the lumen. Reductions in diameter that are estimated to be 70% or greater often result in further evaluation or a revascularization procedure, e.g., a coronary stent placement.

A physiologic-based and more quantitative approach to assess coronary stenosis is to compute Fractional Flow Reserve (FFR), a metric defined as the ratio between hyperemic flow in a diseased artery and the expected hyperemic flow in the same artery without stenosis. In the coronary artery, for example, FFR can be expressed as the ratio of a distal coronary pressure to a proximal coronary pressure. For example, a FFR lower than 0.80 indicates the presence of a severe stenosis requiring revascularization due to the compromised flow to the vascular bed distal to the vessel. Revascularization decisions that incorporate FFR have been shown to improve outcomes compared to angiography alone. Determination of FFR is also robust to different patient geometries, accounting for the contributions of collateral vessels to flow and lesion geometry, for example.

Despite its benefits, healthcare professionals often do not measure FFR for a patient, due to the invasive nature of using a catheter-based pressure measurement. Some have found that physicians choose not to perform FFR in nearly two-thirds of all cases, citing the risk to the patient, lack of resources, and additional cost. Another drawback of FFR is its variability due to different hemodynamic conditions, within a patient.

There is a need for more accurate and less-invasive techniques for diagnosis CAD. More specifically, there is a need for a non-invasive, user-independent approach for FFR measurement that would not pose a risk to the patient.

Recently, some have proposed non-invasive computational workflows for determining FFR and assessing CAD severity. These efforts have adopted one of two distinct approaches. A first approach relies on computed tomography angiography (CTA) data to reconstruct the 3D geometry the coronary tree. While this non-invasive approach has shown promising results in clinical trials, the use of CTA is severely affected by imaging artifacts due to calcification, which make it difficult to delineate the boundaries of the vessel lumen. CTA is also limited in its ability to detect small serial lesions or to capture fine vessel geometry due to its lower spatial resolution compared to angiography. Lastly, CTA data does not provide information on flow, and thus the boundary conditions (BC) for the CFD analysis of hemodynamics typically rely on morphometric or population data and are thus non-patient-specific.

A second approach, also based on non-invasive computational workflows, relies on multi-plane angiography data to reconstruct the 3D geometry of the vessel tree before performing physics-based flow simulations. The main benefit of using angiography is its superior capacity to detect the vessel lumen boundary in the presence of calcified stenoses, and the higher spatial resolution compared to CTA, increasing the sensitivity of the geometry reconstruction algorithm. However, angiography-based approaches for FFR quantification have a fundamental challenge, namely the reconstruction of the 3D geometry of the vessels of interest from a set of 2D images which are acquired over time and for different positions of the patient table. Furthermore, all angiography-based approaches for FFR quantification have produced workflows that require substantial inputs by an operator to identify the vessels of interest and to assist with the segmentation. Lastly, all angiography-based approaches have either considered 3D reconstruction of a single coronary artery or used highly simplified methods to model the flow physics. These shortcomings effectively counteract the benefit of 3D reconstruction of a vessel tree using high-resolution angiography data, the most commonly performed procedure for CAD diagnosis.

Regardless of the approach, all computational-derived FFR methods have shown poor predictive performance around the critical diagnostic value of FFR=0.8, due to the aforementioned limitations on image data quality, lack of information on flow, need for operator input, and computational modeling assumptions. Therefore, there is currently no pipeline for accurate 3D reconstruction based FFR computation that could be effectively deployed to any hospital in the nation.

A significant need exists for a more accurate and less-invasive techniques for 3D object reconstruction for use in medical diagnosis, and specifically for CAD diagnosis, using a non-invasive approach for FFR measurement that is fully-automated.

SUMMARY OF THE INVENTION

Techniques are provided for performing 3D reconstruction of coronary vessel trees. The 3D reconstruction are generated using a trained multi-stage neural network. The accuracy of the resulting 3D reconstructed coronary vessel trees can be used to perform anatomical and functional assessment of coronary artery disease (CAD) using machine learning and computational modeling techniques. Techniques herein address the shortcomings of other types of 3D reconstruction such as projection based approaches and other machine learning methods. The resulting accurate 3D reconstructions may also be useful for non-invasive Fractional Flow Reserve (FFR) quantification based on angiographically derived anatomy and hemodynamics data, and relying on accurate physics-based computational fluid dynamics (CFD) simulation performed using the resultant 3D reconstructed vessels and vessel trees.

In example embodiments, the present techniques provide processes to train and utilize a multi-stage neural network ML model for performing 3D reconstruction of coronary vessel trees. The training of the ML model is performed by generating synthetic coronary vessel trees derived from statistical models of 3D image data such as magnetic resonance angiography and/or computed tomography angiography image data, generating binarized angiography images from different conical projections of the synthetic vessel trees, and using the binarized angiography images to train the ML Model to perform 3D reconstruction from binarized angiography images, (e.g., clinical angiography images).

In accordance with an example, a computer-implemented method for training a vessel tree reconstruction system includes selecting a set of three or more binary angiography images corresponding to three or more different projection angles for each synthetic vessel tree of a set of synthetic vessel trees. The method includes applying a Euclidean distance transform encoding a two-dimensional (2D) diameter of each branch to the binary angiography images and generating Euclidean distance transformed angiography images. Finally the Euclidean transformed angiography images are used to train a 3D vessel tree reconstruction machine learning model capable of reconstructing 3D vessels, wherein the training of the 3D vessel tree reconstruction machine learning model includes a multi-stage convolutional neural network comprising a multi-stage architecture with (i) a vessel centerline stage, and (ii) a radius reconstruction stage.

In another example a method of performing 3D vessel tree reconstruction comprising: providing segmented binary angiography images to a preprocessing module; applying, by the preprocessing module, a Euclidean distance transform encoding a two-dimensional (2D) diameter of each branch to the binary angiography images and generating Euclidean distance transformed angiography images; feeding the set of Euclidean distance transformed angiography images to a trained 3D vessel tree reconstruction machine learning model capable of reconstructing 3D vessels, wherein the trained 3D vessel tree reconstruction machine learning model includes a multi-stage convolutional neural network comprising a multi-stage architecture with (i) a vessel centerline stage, and (ii) a radius reconstruction stage.

BRIEF DESCRIPTION OF THE DRAWINGS

This patent or application file contains at least one drawing executed in color. Copies of this patent or patent application publication with color drawing(s) will be provided by the United States Patent and Trademark Office upon request and payment of the necessary fee.

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
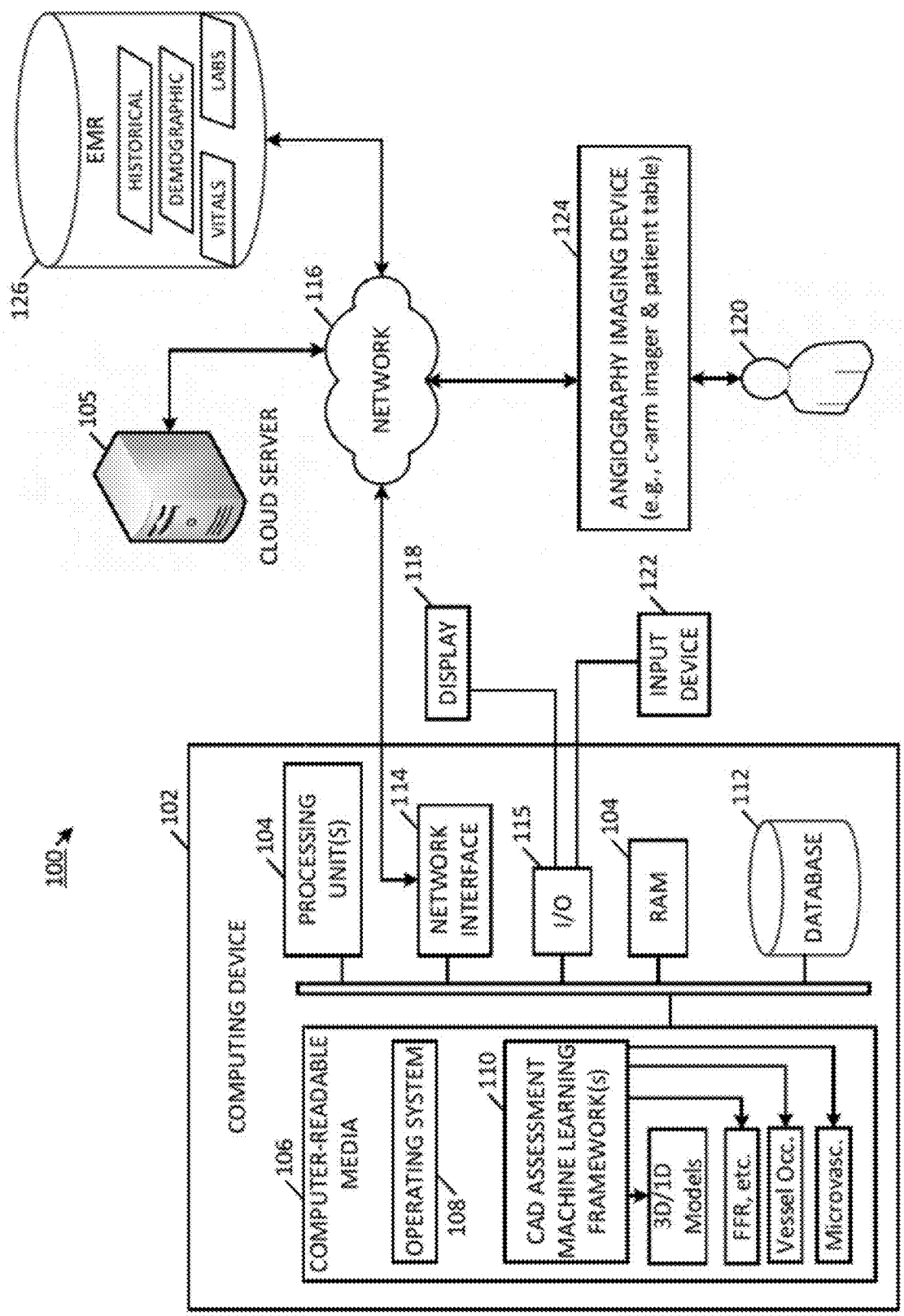
FIG. 1 is a schematic diagram of an example system for performing anatomical and functional assessment of coronary artery disease (CAD), using a machine learning framework for generating 3D reconstructions of vessel trees, in accordance with an example.

Provided are techniques for performing three-dimensional (3D) reconstruction of objects, using a multi-stage neural network machine learning (ML) model. In specific examples described, the 3D reconstruction may be implemented to make anatomical and functional assessments of states of occlusion within vessels (e.g., for assessing coronary artery disease (CAD)). The multi-stage neural network 3D reconstruction of coronary artery trees performs the reconstruction from uncalibrated two-dimension (2D) X-ray angiography images. A plurality of images are taken of a single vessel tree with each image at a different angle or point of view of the vessel tree. The images are binarized and the reconstruction is performed from the binarized images without any knowledge of image acquisition parameters (e.g., distance of camera from vessel, specific angular point of view, relative angles of images, etc.), as is typically required for other 3D reconstruction techniques such as projection-based reconstruction.

The input to the multi-stage neural network ML model is two, three, or more binarized angiograms for a given coronary tree, with a Euclidean distance transform applied to create a smooth field that implicitly encodes vessel radii. For training the ML model, binarized angiograms were created by a synthetic vessel tree generator, also referred to as the synthetic data generator. No angle or distance information is provided to the neural network as an input, therefore, no image calibration or parameter correction algorithms are required in the demonstrated 3D reconstruction methods.

The disclosed 3D reconstruction method utilizes of a single backbone network and separate stages for separate vessel centerline and vessel radius reconstruction. The ML model outputs an analytical matrix representation of the coronary tree which may be used for further analysis and applications such as for hemodynamic modeling of local vessel narrowing (i.e., stenosis). As used herein, state of occlusion of a vessel refers to a determination of vessel health that includes an assessment of vessel health that is based on anatomical features (e.g., determined from angiography images) and functional features (e.g., determined using a physical model and includes flow data). Therefore, as used herein, state of occlusion should be construed as including, but not limited to, degree of stenosis, length of stenosis, various hemodynamic indices such as FFR, and combinations thereof.

The described methods include training of the neural network ML model using a dataset of synthetic coronary trees from a vessel generator using both clinical image data (e.g., MRA and CTA image data) and literature values on coronary anatomy. While the training is described as performed using synthetic vessel trees, the ML model may be trained using images of clinically obtained images of vessel trees and verified using 3D reconstructions of the clinically obtained images. The described multi-stage neural network ML model is capable of achieving sub-pixel accuracy in reconstructing vessel radius, with a root-mean square error (RMSE) of 0.16±0.07 mm and stenosis radius of mean absolute error (MAE) of 0.27±0.18 mm, which is often a very important feature used in diagnosis. The multi-stage neural network ML model also achieves a 52% and 38% reduction in vessel centerline reconstruction errors compared to single-stage neural networks methods and projective geometry-based methods, respectively. The described methods are robust to challenges faced by other 3D reconstruction methods, such as vessel foreshortening and overlap in the input images. The described ML model is a step towards automated analysis of anatomic and functional disease severity in coronary arteries.

In some examples, systems and methods are provided for training a ML model using binary angiography images to reconstruct vessel trees. The training uses images from multiple views of synthetic vessel trees, applies a Euclidean distance transform to encode the 2D diameter of each vessel tree branch, and training the ML Model by a multi-stage convolutional neural network. The multi-stage convolutional neural network includes at least a vessel tree centerline stage, and a radius reconstruction stage. The multi-stage convolutional neural network may include three stages: (i) a first stage including a classification convolutional neural network backbone, (ii) second stage, being the centerline stage, including a multilayer perceptron (MLP) with ReLU activation and batch normalization between layers of the MLP for centerline reconstruction, and (iii) a third stage, being the radius reconstruction stage, including a MLP with ReLU activation and batch normalization between layers of the MLP for radius reconstruction. The output of the second stage is a $M_i \times N_i \times 3$ matrix, with the 3 representing the number of dimensions of the centerline coordinates in cartesian coordinates for each point $N_i$ for each branch $M_i$, of each 3D vessel tree i. The third stage is performed for each branch $M_i$ and the output of the third stage is an $N_i*1$ matrix of radii for each point $N_i$ of each centerline.

The disclosed methods further include performing vessel tree reconstruction by utilizing a ML model trained according to the methods described herein. For example, a user or system may provide a plurality of 2D angiography images of a vessel tree, each image corresponding to a different projection angle of the vessel tree, and the ML model may generate data sets indicative of the 3D reconstruction of the vessel tree. The data sets indicative of the 3D reconstruction of the vessel tree may include one or more $M_i \times N_i \times 4$ matrix, where $M_i$ is a number of branches in the vessel tree i with each branch having a branch centerline, $N_i$ is a number of points on each branch centerline, and 4 is the dimension of the data encoded in each point of the branch centerline, specifically including three spatial dimensional coordinates and a radius.

In FIG. 1, a CAD assessment system 100 includes a computing device 102" or "signal processor" or "diagnostic device") configured to collect angiography image data from a patient 120 via an angiography imaging device 124 in accordance with executing the functions of the disclosed embodiments. The CAD assessment system may be used to implement the training and implementation of the multi-stage neural network 3D reconstruction methods described herein. As illustrated, the system 100 may be implemented on the computing device 102 and in particular on one or more processing units 104, which may represent Central Processing Units (CPUs), and/or on one or more or Graphical Processing Units (GPUs), including clusters of CPUs and/or GPUs, any of which may be cloud based. Features and functions described for the system 100 may be stored on and implemented from one or more non-transitory computer-readable media 106 of the computing device 102. The computer-readable media 106 may include, for example, an operating system 108 and a CAD machine learning (deep learning and/or neural networks) framework 110 having elements corresponding to that of deep learning framework described herein. More generally, the computer-readable media 106 may store trained deep learning models, including vessel segmentation machine learning models, flow extraction machine learning models, Graph-theory or other neural network based reduced order models, executable code, etc. used for implementing the techniques herein. Additionally, the computer-readable media 106 may store executable instructions for training an ML model such as a deep learning model, and/or neural network model as described herein. The computer-readable media 106 and the processing units 104 may store image data, segmentation models or rules, fluid dynamic classifiers, data sets indicative of 3D reconstructions of vessel trees, synthetic vessel trees, and other data herein in one or more databases 112. As discussed in examples herein, the CAD machine learning framework 110 applying the techniques and processes herein (e.g., various different neural networks) may generate 3D and or 1D segmented vessel treed geometric models, FFR and other fluid dynamic assessments, state of vessel occlusion data (such as degree of stenosis), and/or microvascular disease data.

The computing device 102 includes a network interface 114 communicatively coupled to the network 116, for communicating to and/or from a portable personal computer, smart phone, electronic document, tablet, and/or desktop personal computer, or other computing devices. The computing device further includes an I/O interface 115 connected to devices, such as digital displays 118, user input devices 122, etc. As described herein, the computing device 102 generates indications of CAD for a subject, which may include states of vessels in the vasculature, such as a state of vessel occlusion (anatomical and functional through an FFR calculation, through an iFR calculation, or through a QFR calculation) and a state of microvascular disease prediction (by contrasting changes in distal resistance when two hemodynamic states are recorded), as an electronic document that can be accessed and/or shared on the network 116.

In the illustrated example, the computing device 102 is communicatively coupled, through the network 116, to an electronic medical records (EMR) 126 system. The EMR 126 may be a network accessible database or dedicated processing system. In some examples, the EMR 126 includes data on one or more respective patients. That EMR data may include vital signs data (e.g., pulse oximetry derived hemoglobin oxygen saturation, heart rate, blood pressure, respiratory rate), lab data such as complete blood counts (e.g., mean platelet volume, hematocrit, hemoglobin, mean corpuscular hemoglobin, mean corpuscular hemoglobin concentration, mean corpuscular hemoglobin volume, white blood cell count, platelets, red blood cell count, and red cell distribution width), lab data such as basic metabolic panel (e.g., blood urea nitrogen, potassium, sodium, glucose, chloride, $CO_2$, calcium, creatinine), demographic data (e.g., age, weight, race and gender, zip code), less common lab data (e.g., bilirubin, partial thromboplastin time, international normalized ratio, lactate, magnesium and phosphorous), and any other suitable patient indicators now existing or later developed (e.g., use of O2, Glasgow Coma Score or components thereof, and urine output over past 24 hours, antibiotic administration, blood transfusion, fluid administration, etc.); and calculated values including shock index and mean arterial pressure. The EMR data may additionally or alternatively include chronic medical and/or surgical conditions. The EMR data may include historical data collected from previous examinations of the patient, including historical FFR, iFR, or QFR data. Determinations of stenosis, vascular disease prediction, vascular resistance, CFD simulation data, and other data will be produced in accordance with the techniques herein. The EMR 126 may be updated as new data is collected from the angiography imaging device 124 and assessed using the computing device 102. In some examples, the techniques may provide continuous training of the EMR 126.

In conventional angiography imaging applications, angiography images are captured by the medical imager and then sent to an EMR for storage and further processing, including, in some examples image processing, before those images are sent to a medical professional. With the present techniques, the state of occlusion, stenosis, and state of microvascular disease can be determined at computing device based on the angiography images, and without first offloading those images to the EMR 126 for processing. In total, the techniques proposed herein are able to reduce analysis times for cardiologists considerably, and, in part, due to this bypassing of the EMR 126 for processing. The EMR 126 may be simply poled for data during analysis by the computing device 102 and used for storage of state determinations and other computations generated by the techniques herein. Indeed, there are numerous benefits that result from the faster and more automated analyses resulting from the present techniques. For example, modelling and vessel occlusion/disease state analysis can be performed on vessels corresponding to either left or right coronary trees, separately and sequentially, while still producing results for the cardiologist in minutes, for example using the 3D modeler or 1D modeler as described herein.

In the illustrated example, the system 100 is implemented on a single server. However, the functions of the system 100 may be implemented across distributed devices connected to one another through a communication link. In other examples, functionality of the system 100 may be distributed across any number of devices, including the portable personal computer, smart phone, electronic document, tablet, and desktop personal computer devices shown. In other examples, the functions of the system 100 may be cloud based, such as, for example one or more connected cloud CPU(s) or computing systems, labeled 105, customized to perform machine learning processes and computational techniques herein. The network 116 may be a public network such as the Internet, private network such as research institution's or corporation's private network, or any combination thereof. Networks can include, local area network (LAN), wide area network (WAN), cellular, satellite, or other network infrastructure, whether wireless or wired. The network can utilize communications protocols, including packet-based and/or datagram-based protocols such as internet protocol (IP), transmission control protocol (TCP), user datagram protocol (UDP), or other types of protocols. Moreover, the network 116 can include a number of devices that facilitate network communications and/or form a hardware basis for the networks, such as switches, routers, gateways, access points (such as a wireless access point as shown), firewalls, base stations, repeaters, backbone devices, etc.

The computer-readable media 106 may include executable computer-readable code stored thereon for programming a computer (e.g., comprising a processor(s) and GPU (s)) to the techniques herein. Examples of such computer-readable storage media include a hard disk, a CD-ROM, digital versatile disks (DVDs), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. More generally, the processing units of the computing device 102 may represent a CPU-type processing unit, a GPU-type processing unit, a field-programmable gate array (FPGA), another class of digital signal processor (DSP), or other hardware logic components that can be driven by a CPU.

It is noted that while example deep learning frameworks and neural networks herein are described as configured with example machine learning architectures, any number of suitable convolutional neural network architectures may be used. Broadly speaking, the deep learning frameworks herein may implement any suitable statistical model (e.g., a neural network or other model implemented through a machine learning process) that will be applied to each of the received images. As discussed herein, that statistical model may be implemented in a variety of manners. In some examples, the machine learning model has the form of a neural network, Support Vector Machine (SVM), or other machine learning process and is trained using images or multi-dimensional datasets to develop models for 3D reconstruction of vessel trees. Once these models are adequately trained with a series of training images from different viewpoints, the statistical models may be employed in real time to analyze subsequent angiography image data provided as input to the statistical model for determining performing 3D reconstructions of vessel trees, and further for determining the presence of CAD and for determining vessel occlusion status and disease.

In some examples, when a statistical model is implemented using a neural network, the neural network may be configured in a variety of ways. In some examples, the neural network may be a deep neural network and/or a convolutional neural network. In some examples, the neural network can be a distributed and scalable neural network. The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. The neural network or other machine learning processes may include many different sizes, numbers of layers and levels of connectedness. Some layers can correspond to stacked convolutional layers (optionally followed by contrast normalization and max-pooling) followed by one or more fully-connected layers. The present techniques may be implemented such that machine learning training may be performed using a small dataset, for example less than 20,000 images, 15,000 images, 10,000 images, less than 1000 images, or less than 500 images. In an example, approximately 15,00 images were used (three images per vessel tree with 5,000 vessel trees).

Figure 2:
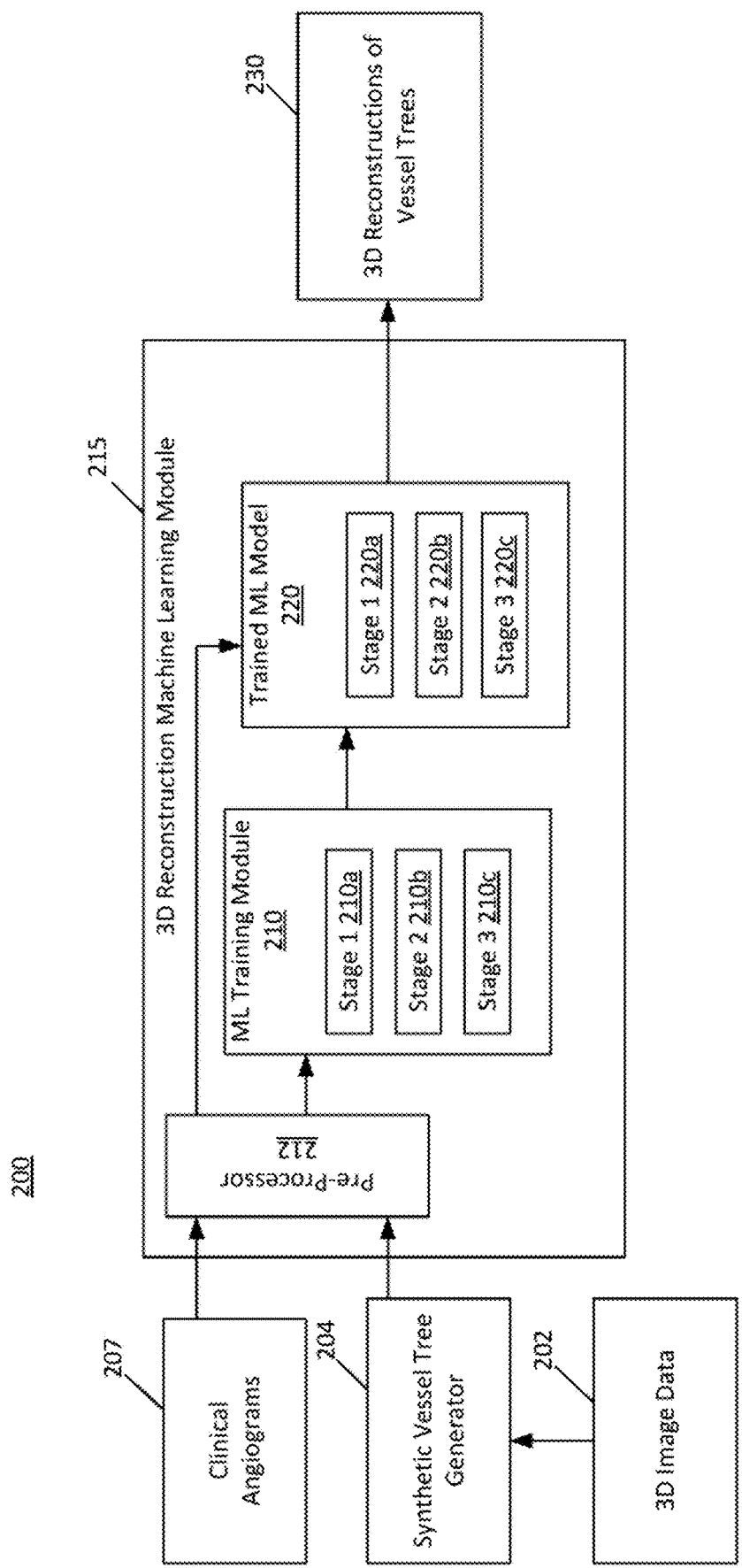
FIG. 2 is a schematic diagram of a 3D reconstruction multi-stage neural network machine learning algorithm and training module framework as may be implemented in the system of FIG. 1, in accordance with an example.
Figure 3A:
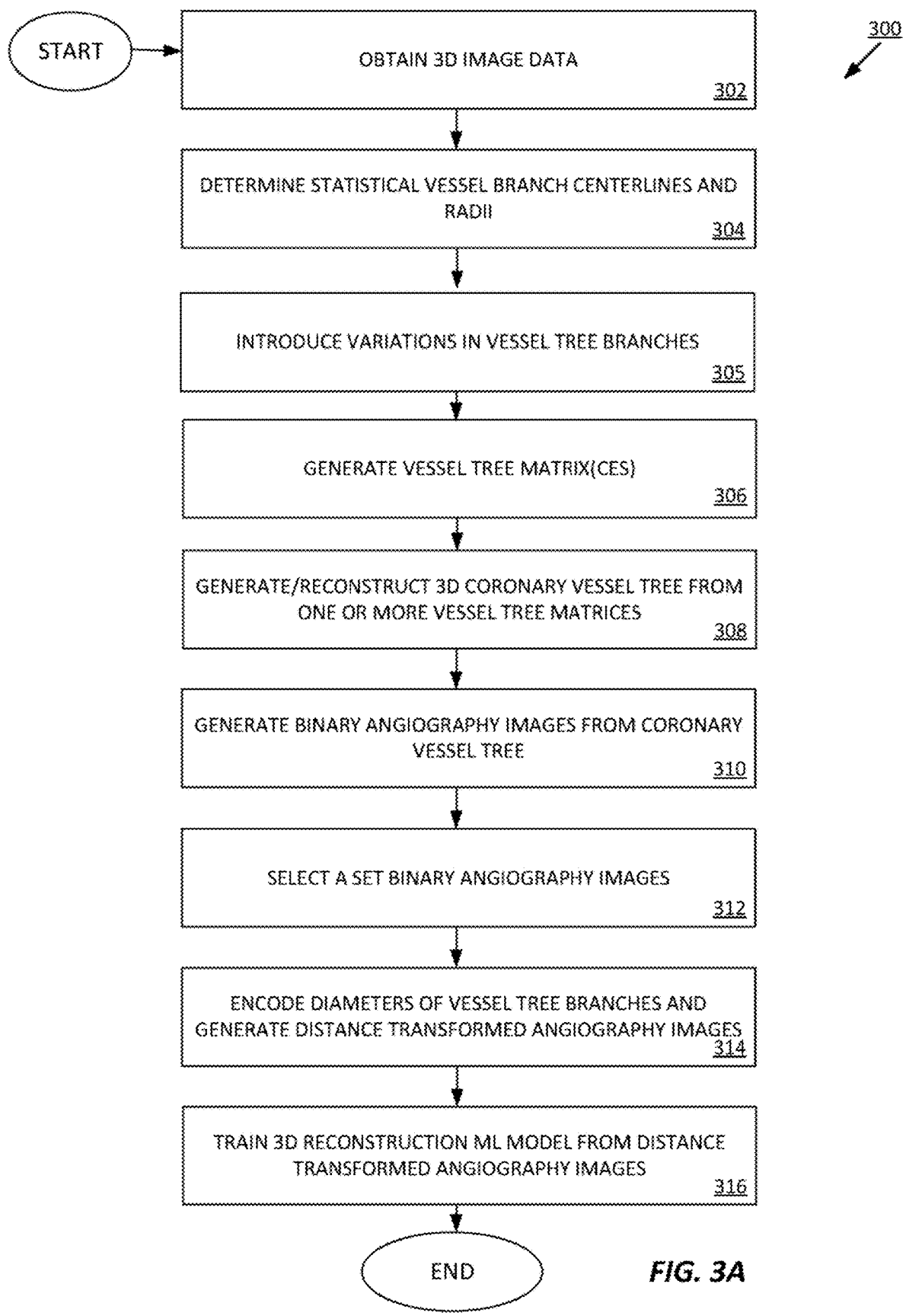
FIG. 3A is a process of a method of generating synthetic vessel trees and training a 3D reconstruction multi-stage neural network machine learning model using the synthetic vessel trees, in accordance with an example.

FIG. 2 illustrates an example multi-stage neural network model 200 for training an ML model, and for performing 3D reconstruction of vessel trees using the trained ML model. FIG. 3A shows a process 300 for training a ML Model for performing 3D reconstruction of coronary vessel trees. The process 300 may be performed by the system 100, and further, the process 300 may be performed according to the schematic diagram of the neural network model of FIG. 2. For clarity, the process 300 will be described with simultaneous reference to elements of FIGS. 1 and 2.

3D image data 202 is obtained by a medical imager, and available through the EMR system 126 of FIG. 1, at a process 302. In examples, the 3D image data includes images of vessel trees that may be obtained by 3D computed tomography angiography (CTA) or by 3D Magnetic resonance angiography (MRA). The 3D image data 202 may then be stored in memory and used for training an ML model, or for providing to a trained ML model for performing 3D reconstruction of vessel trees.

The 3D image data 202 includes images of vessel trees including a plurality of vessel tree branches. In examples, the 3D image data 202 may include images of the left coronary artery tree (LCA), and/or the right coronary artery tree (RCA), with each tree having any arbitrary number of branches. The synthetic vessel tree generator 204 then determines statistical branch centerlines and branch radii from one or more vessel trees, and/or vessel tree branches, at a process 304. The synthetic vessel tree generator 204 may produce, for each branch centerline, a distribution of control points and standard deviations for each control point in 3D space. In generating the synthetic vessel trees, the synthetic vessel tree generator 204 may randomly generate a length of a branch centerline, a statistical distribution of branch centerline control, a most proximal radius of each branch centerline, and a radius tapering factor across the length of the branch, with the radius tapering factor being indicative of the ratio of diameters at the most proximal and most distal location of the vessel branch.

Figure 7:
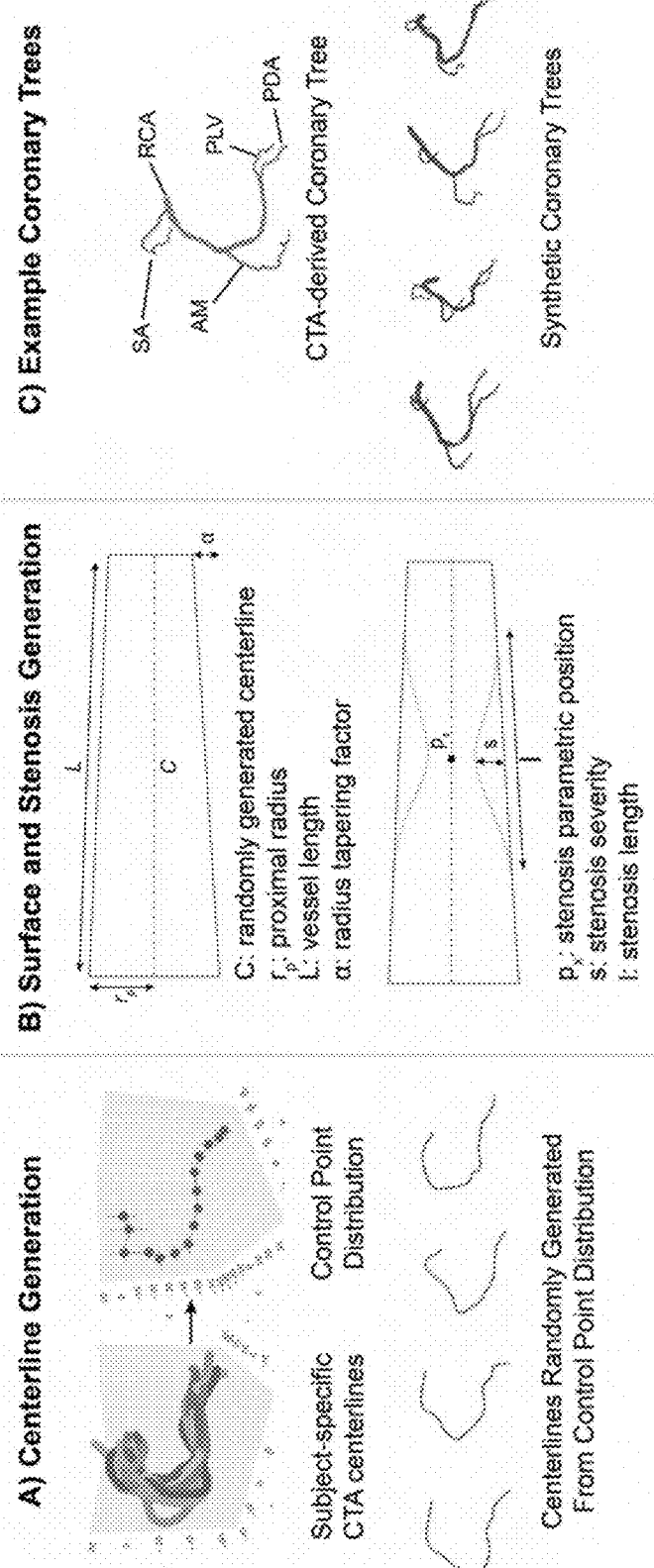
FIG. 7A illustrates an overview of centerline generation for a synthetic 3D coronary tree generator, in accordance with an example.
FIG. 7B illustrates an overview of surface and stenosis generation for a synthetic 3D coronary tree generator, in accordance with an example.
FIG. 7C illustrates example coronary trees generated via a synthetic 3D coronary tree generator, in accordance with an example.

As further illustrated in FIGS. 7A through 7C in reference to a specific application, in an example, a plurality of 3D images of vessel tree branches (FIG. 7A) may be used to determine a statistical centerline from the plurality of branches. The plurality of images may be of a same vessel tree such as the right main coronary artery, sino-atrial node branch acute marginal branch, or another coronary vessel tree branch, with each image obtained from a different patient, or at various times from a single patient. A centerline control point distribution is the generated representing the determined branch centerline. The synthetic vessel tree generator 203 further generates radii for each centerline point from the plurality of 3D images of vessel tree branches.

The synthetic vessel tree generator 204 then introduces variations to the determined vessel tree branch centerline and radii to generate a plurality of synthetic vessel tree branches and synthetic vessel trees. For example, the synthetic vessel tree generator 203 may provide a linear tapering to one or more branches, or sections of branches, of a vessel tree to generate different synthetic vessel trees from the single vessel tree branch centerline. Additionally, the synthetic vessel tree generator 204 may introduce stenosis, shear, rotation, flipping, resizing, warping, or another geometric transformation or manipulation to one or more branches, or sections of branches, to generate various synthetic vessel trees and vessel tree branches. The synthetic vessel tree generator 204 may apply one or more stenosis profiles to one or more branches of one or more synthetic vessel trees to simulate a blood vessel having stenosis. As such, the ML model may be used for performing 3D reconstruction of vessel trees with and without stenosis along one or more of its branches. A stenosis profile may include various geometric profiles that narrow the radius of one or more vessel trees along at least a portion of one or more vessels of the vessel tree. For example, the stenosis profile may be a Gaussian profile or a sinusoidal profile applied to one or more vessels of the vessel tree. The one or more stenosis profiles may be derived from or include one or more of parametric stenosis position data (e.g., location of stenosis along a vessel), stenosis severity data (e.g., degree of narrowing or degree of stenosis, rate of narrowing of a vessel in distance along the vessel), and stenosis length data (e.g., the length along a vessel of the stenosis).

The synthetic vessel tree generator 204 may further generate a 3D volume including a coronary vessel tree. The synthetic vessel tree generator 204 may generate the coronary vessel tree by lofting of contours having a radius, r, for each centerline point $N_i$, of each branch $M_i$, of the vessel tree (further explained in reference to FIG. 5). The coronary vessel tree generated from lofting of the contours defines a 3D analytical representation of the outer boundaries or surfaces of each coronary vessel tree. In examples, a non-uniform b-spline (NURBS) or another spline representation of the surface may be used in generating the 3D analytical surface representation.

To generate the synthetic vessel trees, a processor, such as the processing unit 104 may generate a vessel tree matrix indicative of each respective vessel tree, at a process 306. In examples of implementations described herein, the vessel tree matrix is a $M_i \times N_i \times 4$ matrix, where i is a number index assigned to a given vessel tree (i.e., 1, 2, 3, etc.), $M_i$ is the number of branches in the synthetic vessel tree i with each branch having a branch centerline, and $N_i$ is the number of points on each branch centerline. The final constant dimension of 4 is the number of dimensions of the data encoded in each point of the branch centerline, including three spatial dimensions and a radius value.

After the one or more vessel tree matrices are generated, the process 300 may further include reconstructing a coronary vessel tree as a 3D volume from a vessel tree matrix. The reconstructed or generated coronary vessel tree i has $M_i$ branches, at a process 308. The pre-processor 212 may then generate a set of binary angiography images from the coronary vessel tree, at a process 310. The pre-processor 212 may include one or more processors, such as the processing unit(2) 104 of FIG. 1. The pre-processor 212 may perform cone-beam projection using a set of different projection angles to generate binary angiography images from different angular perspectives of the coronary vessel tree.

A set of at least two binary angiography images is then selected with each image at a different perspective of the coronary vessel tree, at a process 312. Each image provides a different perspective due to the various projection angles used for generating the binary angiography images. In examples described herein, three images will be used for training of an ML model for performing 3D reconstruction, but it should be understood that two images, four images, or more images may be used for both training the ML model, and for performing reconstruction of 3D objects such as coronary vessel trees. In examples, clinically obtained 2D binary angiography images may be used for the training, or synthetic vessel trees may be generated, as described herein, from MRA and CTA image data. The various binary angiography images may then be stored in the computer-readable media 106 for further use in training the 3D reconstruction ML model.

The pre-processor 212 then applies a Euclidean distance transform to each of the binary angiography images and encodes a 2D diameter of each branch of the vessel tree to each binary angiography image., at a process 314. Using the Euclidean distance transform, the pre-processor generates a Euclidean distance transformed angiography image from each binary angiography image.

Figure 3B:
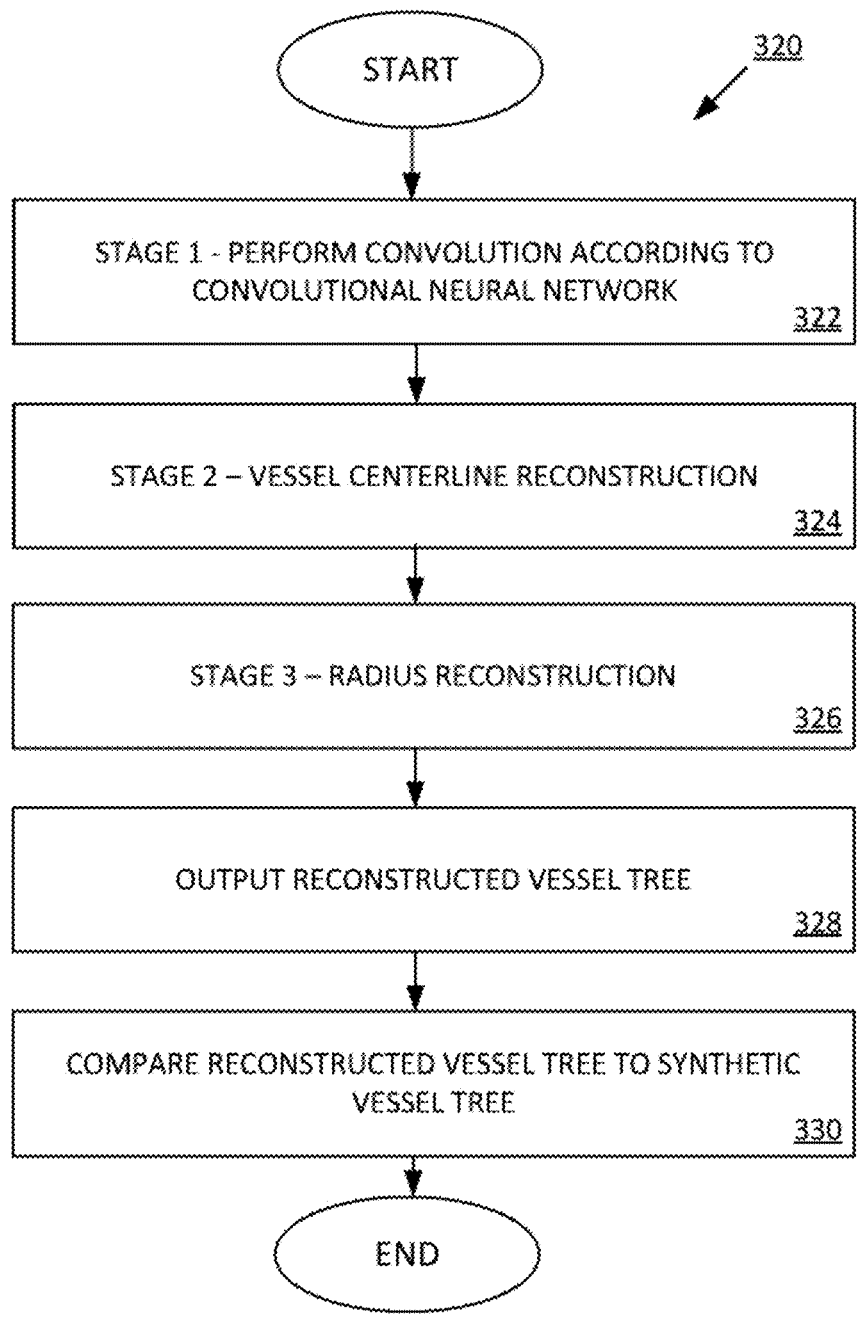
FIG. 3B shows a process for performing training of a 3D reconstruction multi-stage neural network machine learning model, in accordance with an example.

The ML training module 210 then uses the Euclidean distance transformed angiography images to train the 3D vessel tree reconstruction ML model capable of reconstructing 3D vessel trees, at a process 316. Training of the ML model at process 316 is further described in more detail with reference to FIG. 3B with the training process 320. The ML training module 210 includes three stages for training the ML model. A first stage ("Stage 1") 210a includes a classical convolutional neural network backbone for image classification at a process 322. The ML training module 210 further includes a second stage ("Stage 2") 210b, referred to herein as a vessel centerline stage, and a third stage ("Stage 3") 210c referred to herein as a radius reconstruction stage. While described as different stages, it should be understood that the neural network backbone used to train the first stage and perform the convolution, may be used to further train stage 2 210b and stage 3 210c, or at least one MLP of the Stage 2 210b, and/or stage 3 210c. Alternatively, each MLP of each stage, and each stage itself, may be trained independently of each other stage and MLP.

The vessel centerline reconstruction stage includes a multilayer perceptron (MLP) with rectified linear unit (ReLU) activation, at a process 324. The vessel centerline reconstruction stage further includes a batch normalization between layers of the MLP for performing centerline reconstruction. The vessel centerline reconstruction stage takes in the Euclidean distance transformed angiography images and outputs at least a $M_i \times N_i \times 3$ matrix, with $M_i$ representing the number of branches, and $N_i$ being the number of points in each branch, and 3 being the number of the dimensional coordinates for each centerline point $N_i$ of each branch $M_i$. The centerline coordinates of the points may be cartesian coordinates, polar coordinates, or another coordinate system to indicate spatial coordinates of the points $N_i$. Stage 2 210b is perform for each vessel tree and outputs the $M_i \times N_i \times 3$ matrix for each vessel tree i.

The radius reconstruction stage includes a MLP with ReLU activation with batch normalization between layers of the MLP for performing radius reconstruction, at a process 326. The radius reconstruction stage is performed for each branch $M_i$. The radius reconstruction stage takes the Euclidean distance transformed angiography images as inputs, and the radius reconstruction stage outputs an $N_i \times 1$ matrix of radii values, with each radii value corresponding to a respective centerline point $N_i$. The $N_i \times 1$ matrix of radii values are concatenated with the $M_i \times N_i \times 3$ matrix to form the output $M_i \times N_i \times 4$ matrix with spatial coordinates and corresponding radii for each centerline point $N_i$.

The process 300 may further generate reconstructed vessel trees from the $M_i \times N_i \times 4$ matrix, at a process 328. The reconstructed vessel trees may include a low fidelity vessel tree that includes the branches formed from the centerline points and associated radii at each centerline point. The reconstructed vessel trees may include a high fidelity vessel tree that includes a volume, with the volume defined by creating a surface spline between outer radii of the radii of each centerline point for each branch of the vessel trees. The high fidelity vessel tree may be referred to as a 3D representation, while the low fidelity vessel tree may be referred to herein as a 1D representation.

To train the 3D reconstruction ML model 220, the ML training model 210 may implement a loss function comparing the synthetic vessel trees to corresponding reconstructed vessel trees for training the multi-stage convolutional neural network, at a process 330. The loss function includes one or more mean square error calculations comparing the mean square error between data associated with the set of synthetic vessel trees and the reconstructed vessel trees. The ML model 220 may be trained by reducing the mean square error of the synthetic vessel trees and the reconstructed vessel trees. The data associated with the set of synthetic vessel trees and the reconstructed vessel trees may include data corresponding to vessel tree length, one or more vessel diameters, vessel tortuosity, and/or stenosis patterns. The loss function may include regularization terms to prioritize or provide weight for optimizing the loss function based on some of the specific data and parameters over others.

As illustrated in FIG. 2, the trained ML model 220 includes three stages: Stage 1 220a, Stage 2 220b, and Stage 3 220c. Stage 1 220a includes a trained convolutional neural network backbone, Stage 2 220b is referred to herein as a trained vessel centerline stage, and Stage 3 210c is referred to herein as a trained radius reconstruction stage.

Figure 4:
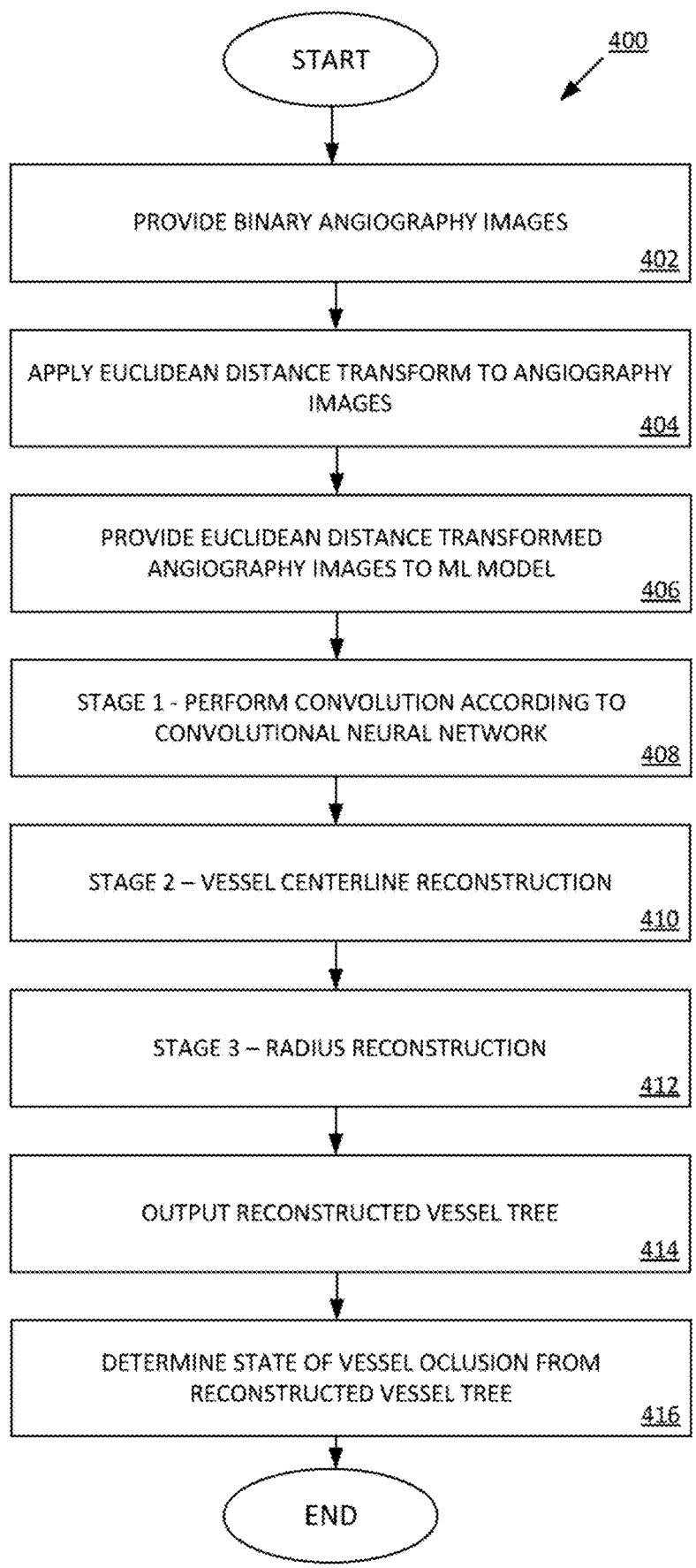
FIG. 4 shows a process for performing 3D reconstruction of coronary vessel trees using a trained ML model, as may be performed by the system of FIG. 1, in accordance with an example.

FIG. 4 shows a process 400 for performing 3D reconstruction of coronary vessel trees using a trained ML model. The process 400 may be performed by the system 100, and further, the process 400 may be performed according to the schematic diagram of the neural network model of FIG. 2. For clarity, the process 400 will be described with simultaneous reference to elements of FIGS. 1 and 2.

The process 400 includes providing segmented binary angiography images to the pre-processor 212, at a process 402. The segmented binary angiography images may be provided to the pre-processor 212, or clinical angiograms 207 may be provided to the pre-processor 212 and the pre-processor may perform segmentation of the clinical angiograms 207 to generate the segmented binary angiogram images. The pre-processor 212 then applies a Euclidean distance transform to encode a 2D diameter of each branch of a vessel tree to the binary angiography images, at a process 404. The pre-processor 212 then generates distance transformed binary angiography images.

The pre-processor 212 provides the Euclidean distance transformed angiography images to a trained 3D vessel reconstruction ML model, at a process 406. The 3D vessel reconstruction machine learning model is a machine learning model trained to generate reconstructions of 3D vessels and vessel trees from angiography images. As previously described, the trained ML model 220 includes three stages for performing 3D vessel tree reconstruction. The first stage, Stage 1 220a, includes a trained classical convolutional neural network backbone for image classification, at a process 408. While described as different stages, it should be understood that the neural network backbone used in Stage 1 may be used to perform operations in Stage 2 220b and Stage 3 220c, or at least to perform one MLP of the Stage 2 220b, and/or Stage 3 220c. Alternatively, each MLP of each stage, and each stage itself, may use a different neural network or neural network backbone to perform each stage independently of each other stage and MLP. Additionally, Stage 2 220b and Stage 3 220c may be performed independently and therefore may be performed simultaneously.

The trained vessel centerline reconstruction stage includes a MLP with ReLU activation, at a process 410. The trained vessel centerline reconstruction stage further includes a batch normalization between layers of the MLP for performing centerline reconstruction. In specific examples, the centerline stage, the MLP is composed of 4 hidden layers, where the first 3 layers have 1024 neurons and the last layer has 512 neurons. The trained vessel centerline reconstruction stage takes in the Euclidean distance transformed angiography images and outputs at least a $M_i \times N_i \times 3$ matrix, with $M_i$ representing the number of branches, and $N_i$ being the number of points in each branch, and 3 being the number of the dimensional coordinates for each centerline point $N_i$ of each branch $M_i$. The centerline coordinates of the points may be cartesian coordinates, polar coordinates, or another coordinate system to indicate spatial coordinates of the points $N_i$. Stage 2 220b is perform for each vessel tree and outputs the $M_i \times N_i \times 3$ matrix for each vessel tree i.

The trained radius reconstruction stage includes a MLP with ReLU activation with batch normalization between layers of the MLP for performing radius reconstruction, at a process 412. The trained radius reconstruction stage is performed for each branch $M_i$. The trained radius reconstruction stage takes the Euclidean distance transformed angiography images as inputs, and the trained radius reconstruction stage outputs an $N_i \times 1$ matrix of radii values, with each radii value corresponding to a respective centerline point $N_i$. The $N_i \times 1$ matrix of radii values are concatenated with the $M_i \times N_i \times 3$ matrix to form the output $M_i \times N_i \times 4$ matrix with spatial coordinates and corresponding radii for each centerline point $N_i$. In a specific example, the trained radius reconstruction stage includes a separate MLP for each vessel branch, for a total of $M_i$ MLPs for a given vessel tree i. In an example, the radius MLPs are composed of three hidden layers with 128 neurons each, with batch normalization and ReLU activation between each hidden layer. The MLP for each branch may be trained separately to improve the network's ability to capture sudden reductions in vessel radii at regions of stenosis. Without the independent training of each MLP for each branch, stenoses may be overlooked since they make up a small portion of the points in the coronary vessel tree.

The process 400 may further generate reconstructed vessel trees 230 from the $M_i \times N_i \times 4$ matrix, at a process 414. The reconstructed vessel trees 230 may include a low-fidelity vessel tree that includes the branches formed from the centerline points and associated radii at each centerline point. The reconstructed vessel trees may include a high-fidelity vessel tree that includes a volume, with the volume defined by creating a surface spline between outer radii of the radii of each centerline point for each branch of the vessel trees. The low fidelity vessel tree may be referred to herein as a 1D representation of the reconstructed vessel tree, while the high-fidelity vessel tree may be referred to as a 3D representation. To generate the high-fidelity representation, a B-spline, or a non-uniform rational B-spline may be used to form surfaces and define the 3D volume from the $M_i \times N_i \times 4$ matrix.

In some implementations, the reconstructed vessel trees 230 may be used for medical diagnosis or analysis of a vessel tree. For example, the process 400 may further include identifying a vessel inspection region of a reconstructed vessel tree 230, and determining a state of vessel occlusion from either of the low-fidelity representation, or the high-fidelity representation of the vessel tree, at a process 416. The vessel inspection region may be a region of the reconstructed vessel tree 230 corresponding to a region of the reconstructed vessel tree containing a vessel tree structure. The vessel inspection region may be determined from the clinical angiograms 207, segmented binary angiography images, or another image used in the process 400 for performing 3D reconstruction of vessel trees. Further details of using the reconstructed 3D vessel trees for determining and analyzing vessel occlusion can be found in U.S. Pat. No. 11,386,563 originally filed Nov. 23, 2020, the entirety of which is incorporated by reference herein.

Figure 5:
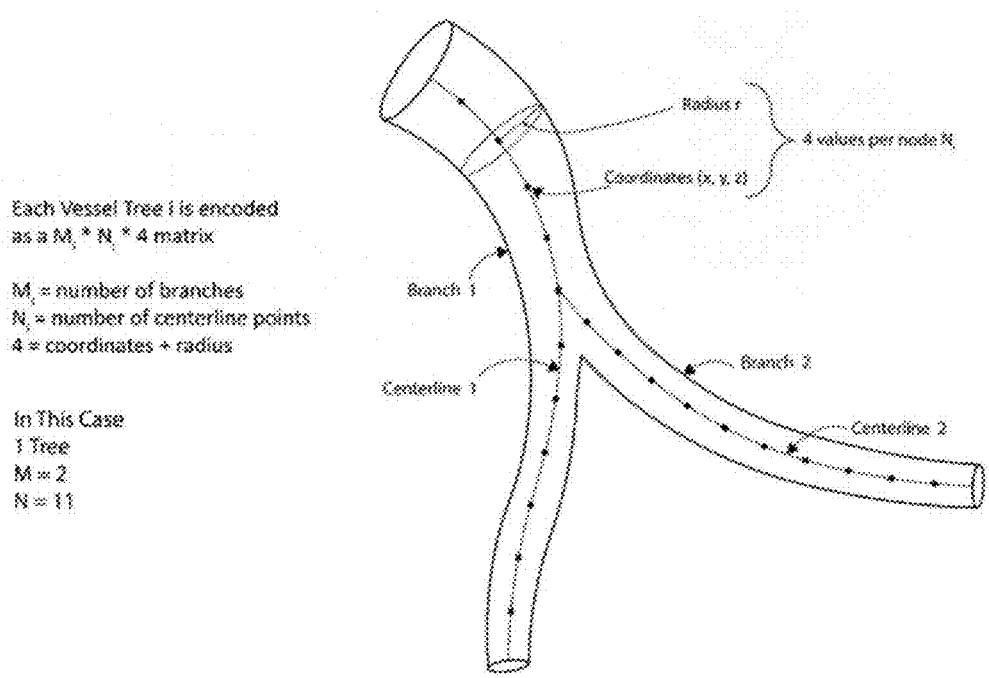
FIG. 5 illustrates an example of both a high-fidelity, or 3D vessel tree, representation and a low-fidelity, or 1D vessel tree, representation of a coronary vessel tree, in accordance with an example.

FIG. 5 illustrates an example of both a high-fidelity, or 3D vessel tree, representation and a low-fidelity, or 1D vessel tree, representation of a vessel tree. The low-fidelity, or 1D vessel tree model representation, is given by the centerline coordinates and values of radius of each point $N_i$ for each branch $M_i$. The high-fidelity reconstruction representation includes the volume bounded by the smooth analytical surface formed between the radii at each centerline coordinate point with the volume encompassing all centerline points $N_i$. In the illustrated example, the vessel tree i is represented by a tree matrix $M_i \times N_i \times 4$, where $M_i$ is the number of branches in the vessel tree i, $N_i$ is the number of points on each branch centerline, and 4 is the numerical dimension of the data encoded in each point of the branch centerline, specifically its three-dimensional spatial coordinates (x, y, z) and radius r.

Figure 6:
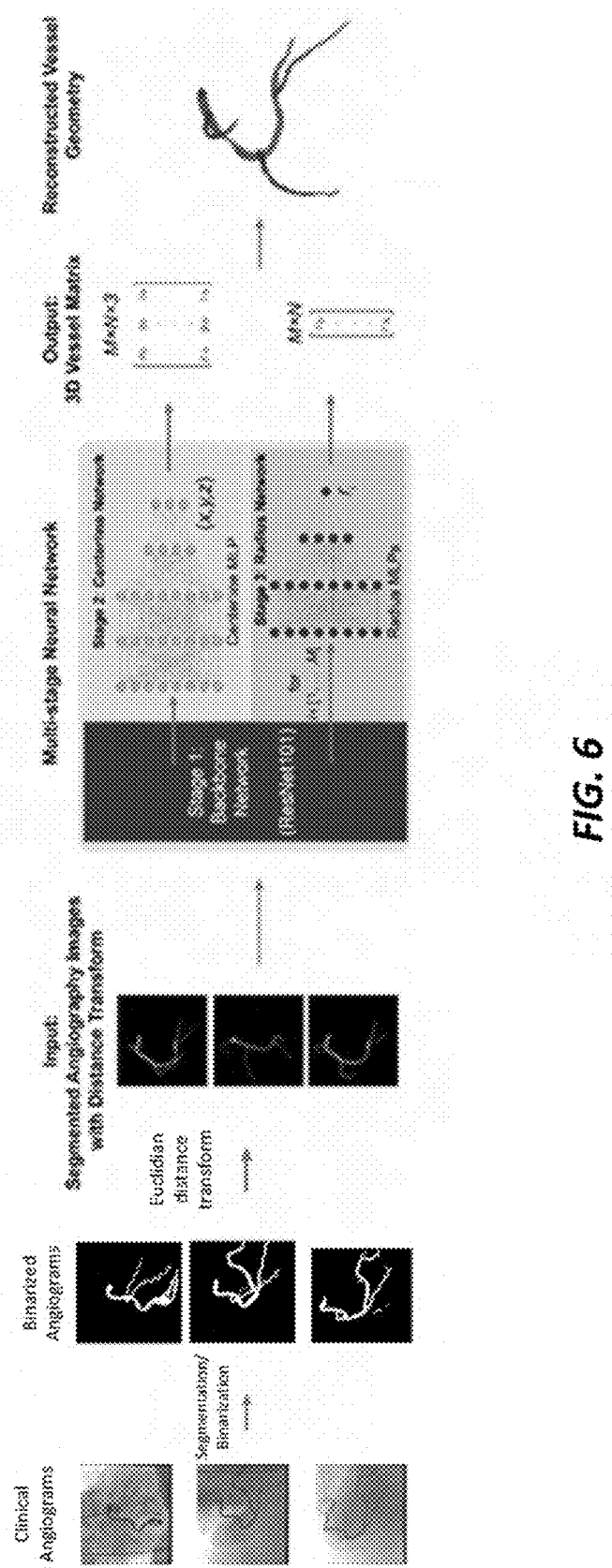
FIG. 6 is a schematic diagram of an example implemented architecture of a neural network with angiogram inputs and output 3D reconstructed vessel tree, in accordance with an example.

FIG. 6 is a schematic diagram of an example implemented architecture of a neural network with angiogram inputs and output 3D reconstructed vessel tree. The multi-stage neural network was designed to reconstruct both vessel centerlines (Stage 2) and radii (Stage 3) for each branch in a coronary tree. The centerline and radius stages both employed a convolutional neural network backbone to train the ML model to prioritize and accurately reconstruct relevant features of the coronary tree from the input images. As an example, a ResNet101 backbone was used as the backbone neural network. While the convolutional layers can learn image-based features relevant to the vessel geometry, a MLP may be better at solving regressions for identifying the 3D coordinates of the vessel centerline points and corresponding radii. Therefore, the final layer of the backbone network included separate MLPs for the centerline stage and radius stage.

In the centerline stage, the final fully connected layer of the backbone network was replaced by a MLP with ReLU activation and batch normalization between layers. The MLP was composed of 4 hidden layers, where the first 3 layers had 1024 neurons and the last layer had 512 neurons. The output of the centerline MLP was a $M_i \times N_i \times 3$ linear layer, containing $N_i$ centerline points for each of the $M_i$ branches in the binarized angiogram. This output vector was reshaped into a matrix before computing the loss for training.

Meanwhile, the radius stage replaced the final layer of the backbone with a separate MLP for each vessel branch, for a total of $M_i$ MLPs. The radius MLPs were composed of three hidden layers with 128 neurons each, with batch normalization and ReLU activation between each hidden layer. The output of each MLP was a vector of radii of dimension N. The MLP for each branch was trained separately to improve the network's ability to capture sudden reductions in vessel radii at regions of stenosis. Without this step, stenoses may be overlooked since they make up a small portion of the points in the coronary tree.

The radius stage was trained using a mean squared error as a loss function, Eq. 1.

$$\frac{1}{n}\sum_{i=0}^{n}(y_i - \hat{y}_i)^2 \qquad \text{Eq. 1}$$

In Eq. 1 y is the ground truth, taken as the actual radii of the input vessel tree branches from the input vessel tree, and ŷ is the neural network prediction radii reconstruction. As used herein, "ground truth" values and features refer to the values and features of the input vessel trees, while "predicted" values and features are values associated with the ML model reconstructed vessels, branches, and vessel trees. The centerline stage was trained using the same loss function with an additional vessel length regularization term, Eq. 2.

$$\frac{1}{n}\sum_{i=0}^{n}(y_i - \hat{y}_i)^2 + \lambda \sum S_y - S_{\hat{y}} \qquad \text{Eq. 2}$$

In Eq. 2 $\lambda$ is a regularization rate, $S_y$ is an arclength of the ground truth branches, and $S_{\hat{y}}$ is the arclength of the predicted branches. The vessel length regularization term was included because vessel length is an important determinant of the pressure gradient through a vessel, an important indicator of disease severity.

An Adaptive Moment Estimation (ADAM) optimizer with learning rate 5e-4 and weight decay, L2, regularization was used to train both the centerline reconstruction and the radii stages. The batch size was set to 8 and the multi-stage network was trained for 300 epochs. For the radii stage MLPs, the backbone was frozen after the initial 300 epochs and each branch MLP was trained for an additional 50 epochs.

For comparison, a single-stage neural network model was developed as a counterpart to the multi-stage network described above. The single-stage network architecture was composed of the backbone network and a single MLP which outputs an M×N×4 matrix containing both the centerline points and their associated radii, as shown in FIG. 1. The single-stage network used a single MLP to determine both the centerline reconstruction and radius reconstruction in a single stage. The loss function of the single-stage network was a weighted mean square error loss function, Eq. 3.

$$\frac{1}{n}\sum_{i=0}^{n}(y_i - \hat{y}_i)^2 + \mu(r_i - \hat{r}_i)^2 \qquad \text{Eq. 3}$$

In Eq. 3 $y_i$ and $\hat{y}_i$ represent the ground truth and predicted centerline coordinates while $r_i$ and $\hat{r}_i$ represent the ground truth and predicted radii along the centerlines. The regularization parameter β was chosen such that the centerline and radius terms were of the same order of magnitude. The single-stage network was trained using the same hyperparameters as the multi-stage network to make a fair comparison using an ADAM optimizer with learning rate 5e-4, L2 regularization, and a batch size of 8.

To train the proposed multi-staged neural network, hundreds to thousands of ground truth 3D coronary trees can be used with their corresponding segmented 2D angiograms. In practice, this means that thousands of patients with both 3D CTA data and 2D X-ray angiograms must be identified, which is typically not feasible in many medical centers and for many studies. Another challenge of using clinical image data as input for training thew ML model is that the coronaries deform in each frame of an X-ray angiography series due to the contraction of the heart. This necessitates temporal registration of frames from multiple angiographic series in order to create a valid set of input images for 3D coronary tree reconstruction. To produce a large enough dataset and eliminate external sources of error such as temporal registration, a method to produce a sufficiently large training dataset consisting of 5,000 static 3D coronary tree geometries and their corresponding sets of 2D projections was devised. While synthetic data has been used to train and validate the 3D reconstruction multi-stage neural network described herein, the use of synthetic projection images as input does not preclude future clinical application. A segmentation algorithm or neural network such as Angio-Net could be used to convert clinical angiograms obtained during routine patient care in the future into a suitable input for the described 3D reconstruction neural network ML model.

The examples provided focus on 3D reconstruction of the right coronary tree as the large anatomical variation in the left coronary arteries which makes reconstruction more challenging. A method for generating sets of synthetic angiogram images is implemented. The method includes two steps: 1) a synthetic 3D coronary tree generator, and 2) a projection algorithm to create sets of segmented angiograms.

For the first step, a synthetic 3D coronary tree generator generates one or more synthetic vessel trees. FIGS. 7A through 7C illustrate an overview of the synthetic 3D coronary tree generator. A distribution of patient-specific centerlines was obtained from 10 CTAs for four main branches of the right coronary tree, namely the right main coronary artery (RCA), sino-atrial node branch (SA), acute marginal branch (AM), and posterior-descending artery (PDA). The posterolateral ventricular branch (PLV) is implicitly included as part of the RCA, which bifurcates into the PDA and PLV branches. This data was used to identify a statistical distribution of controls points and their standard deviations in 3D space for each branch of the coronary tree, illustrated in FIG. 7A. From this distribution, new vessels were generated using uniform random sampling. A linearly tapering of the radius was assigned to each vessel branch, and stenoses with a gaussian profile were randomly introduced, FIG. 7B. Branches were combined into a tree and augmented with random rotation, shear, and/or warping, FIG. 7C. The synthetic tree generator algorithm was refined through repeated iterations with a board-certified interventional cardiologist to generate realistic trees, until the cardiologist was unable to tell the difference between real images of vessel trees and the synthetically generated vessel trees.

Figure 8:
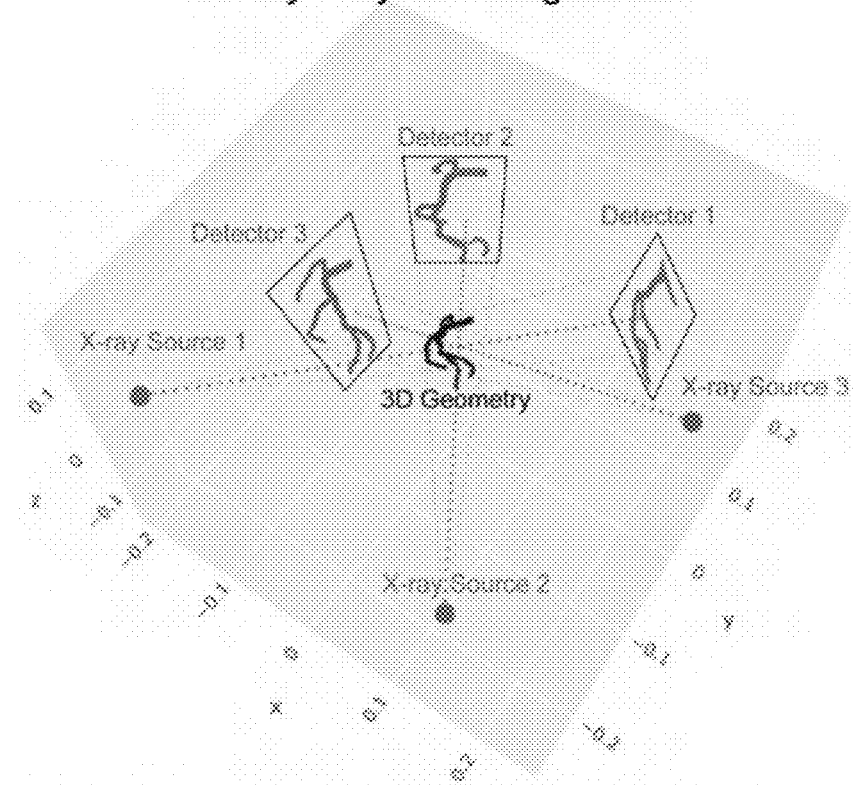
FIG. 8 illustrates a process of taking multiple projections of a synthetic vessel tree and generating binary angiogram images, in accordance with an example.
Figure 8:
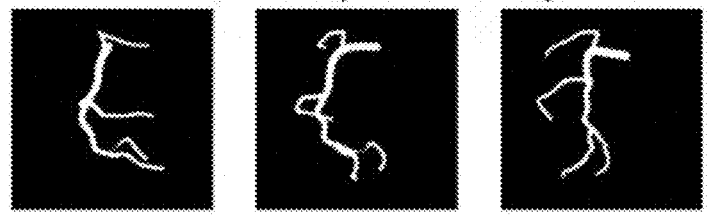
Figure 8:
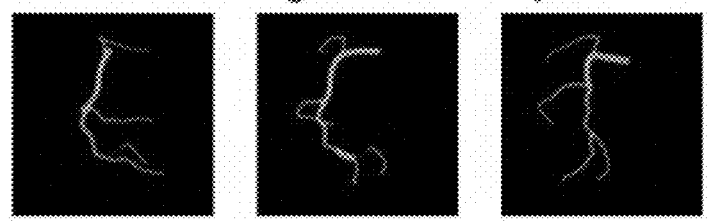

In the second step of the method for generating synthetic angiogram images, projections were taken of the generated synthetic vessel trees. Cone-beam projections of each coronary tree were generated from 5 views to mimic an X-ray angiogram acquisition process. Image acquisition angles were randomly sampled from 20-degree windows around commonly used clinical values. Out of the 5 views, 3 were randomly chosen for training. FIG. 8 illustrates the method of taking multiple projections of a vessel tree and generating binary angiogram images. Since the binary images lack distance information, a Euclidean distance transform was applied to the projection images. The resulting distance transformed binary angiogram images were then input to train the neural network. The synthetic vessel trees generated by the described steps were split into 4,500 coronary trees and corresponding projections for training, and 500 for validation, resulting in a 90-10 training split.

Several methods to evaluate the performance of the proposed method were conducted. First reconstruction error of our multi-stage network was compared against the previously described single-stage neural network to demonstrate the advantages of the multi-stage approach. A head-to-head comparison between the multi-stage neural network reconstruction method and a projection-based method was then conducted. Both comparisons were performed on single vessel geometries for simplicity. The performance of the method in reconstructing right coronary trees was then considered. Lastly, an analysis of how geometric reconstruction error affects hemodynamics was conducted.

Figure 9:
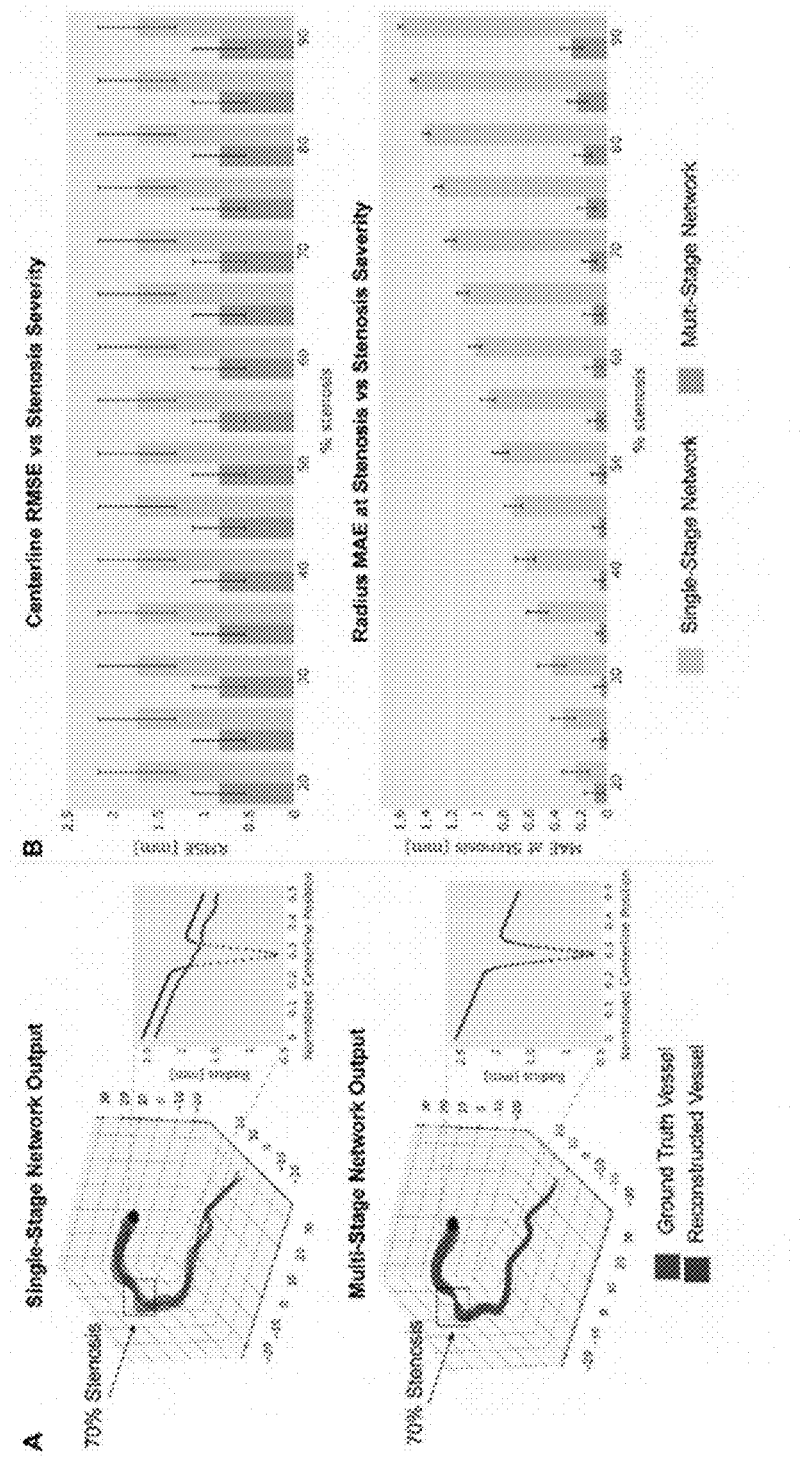
FIG. 9 illustrates an example of a vessel geometry with 70% stenosis and comparison of single- and multi-stage model reconstruction, in accordance with an example.

A feature of the disclosed 3D reconstruction methods is its multi-stage nature, which considers the tasks of centerline and radius reconstruction separately. The importance of the separate reconstructions of the centerline and radii is illustrated via a comparison between the single- and multi-stage networks. The performance of both networks was evaluated using 10 distinct RCA synthetic vessels. For each synthetic vessel, stenoses between 20-90%, with increments of 5%, were introduced, for a total of 150 unique vessel geometries. Reconstruction error was assessed for each geometry. An example of a vessel geometry with 70% stenosis and its single- and multi-stage reconstructions is shown in FIG. 9. On average, the root mean squared error (RMSE) of the multi-stage network centerline was 52% lower than the single-stage centerline RMSE ($0.83 \pm 0.29$ mm vs $1.73 \pm 0.42$ mm), as shown in the right panel (panel B) of FIG. 9.

As for radius reconstruction accuracy, mean absolute error (MAE) at the stenosis was evaluated instead of RMSE in the whole vessel to accurately predict stenosis severity. The MAE across all vessels was $0.117 \pm 0.068$ mm for the multi-stage network and $0.927 \pm 0.436$ mm for the single stage network. For both networks, the MAE increased with the stenosis severity. The single-stage network effectively failed to detect the stenosis for all levels of stenosis, left panel of FIG. 9, resulting in extremely large MAE errors (over 1.5 mm) for severe stenoses with over 80% diameter reduction.

Figure 10:
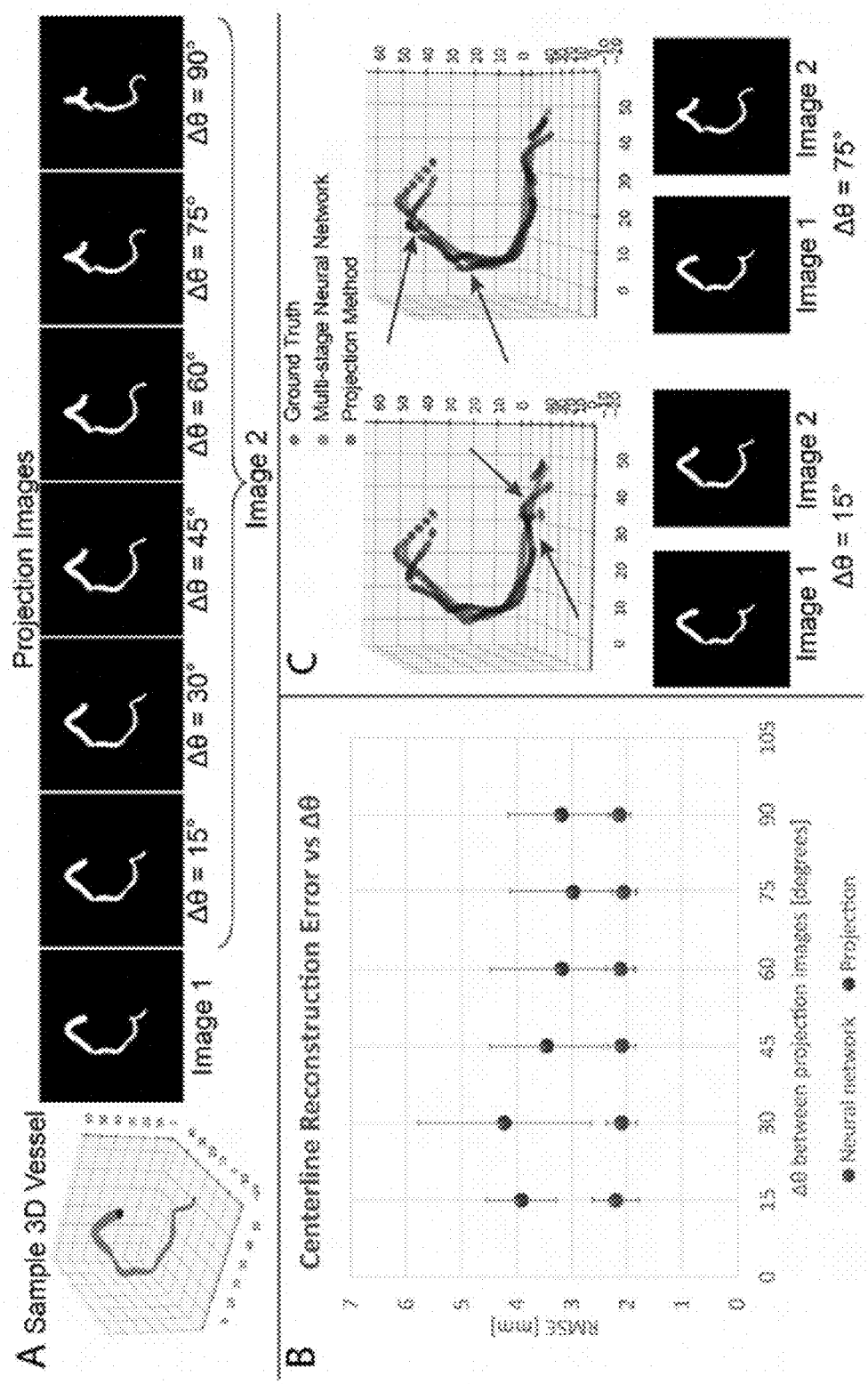
FIG. 10 presents a comparison between the performance of a multi-stage neural network reconstruction versus a projection-based method, in reconstructing a sample 3D synthetic vessel and given sets of corresponding projection images (15 degrees apart), in accordance with an example.

The performance of the multi-stage neural network was then compared with a projection-based method in the simplest case of a single vessel centerline reconstruction from 2 projection images. In the projection-based reconstruction method, a point cloud approach was used to automatically identify up to 10 possible corresponding points for each centerline point in the reference projection image. The set of possible corresponding points was further refined using a reprojection error and ordering constraint cost function. Matched points from both images were then back-projected and interpolated with a b-spline to create a 3D centerline. FIG. 10 presents a synthetic single vessel used for the comparison along with binarized projection images and results of the comparison. For the dataset of synthetic projection images for this comparison, five synthetic RCA vessels were first generated. A spherical coordinate system $(\theta, \phi)$, where $\theta$ and $\phi$ are the azimuthal and elevation angles, respectively, was used for the projections, top panel A of FIG. 10. For a given vessel, the first projection image in every pair was fixed at $\theta=-45°$, $\phi=0$. The second image was defined using six different intervals $\Delta\theta \in [15°, 90°]$, for a total of 30 different pairs of projection images (5 different vessels, 6 different angles between projection images for each vessel). The reconstruction error as a function of the angle between projection images, $\Delta\theta$, was compared between both methods.

As seen in panel B of FIG. 10, the centerline RMSE and standard deviation was lower in the neural network approach compared to the projection-based method for all tested angles and vessels: $2.12 \pm 0.05$ mm and $3.49 \pm 0.44$ mm, respectively. Panel C of FIG. 10 shows two examples of the same vessel reconstructed using 2 pairs of projection images with different $\Delta\theta$. The ground truth centerline (blue), neural network centerline (red), and projection-based centerline (brown) are shown. The neural network centerline followed the average path of the ground truth centerline, although it failed to capture some of the bends along its path (red arrows). Meanwhile, the brown arrows indicate gaps or regions of uncertainty in the centerline reconstructed using projection-based methods.

Figure 11:
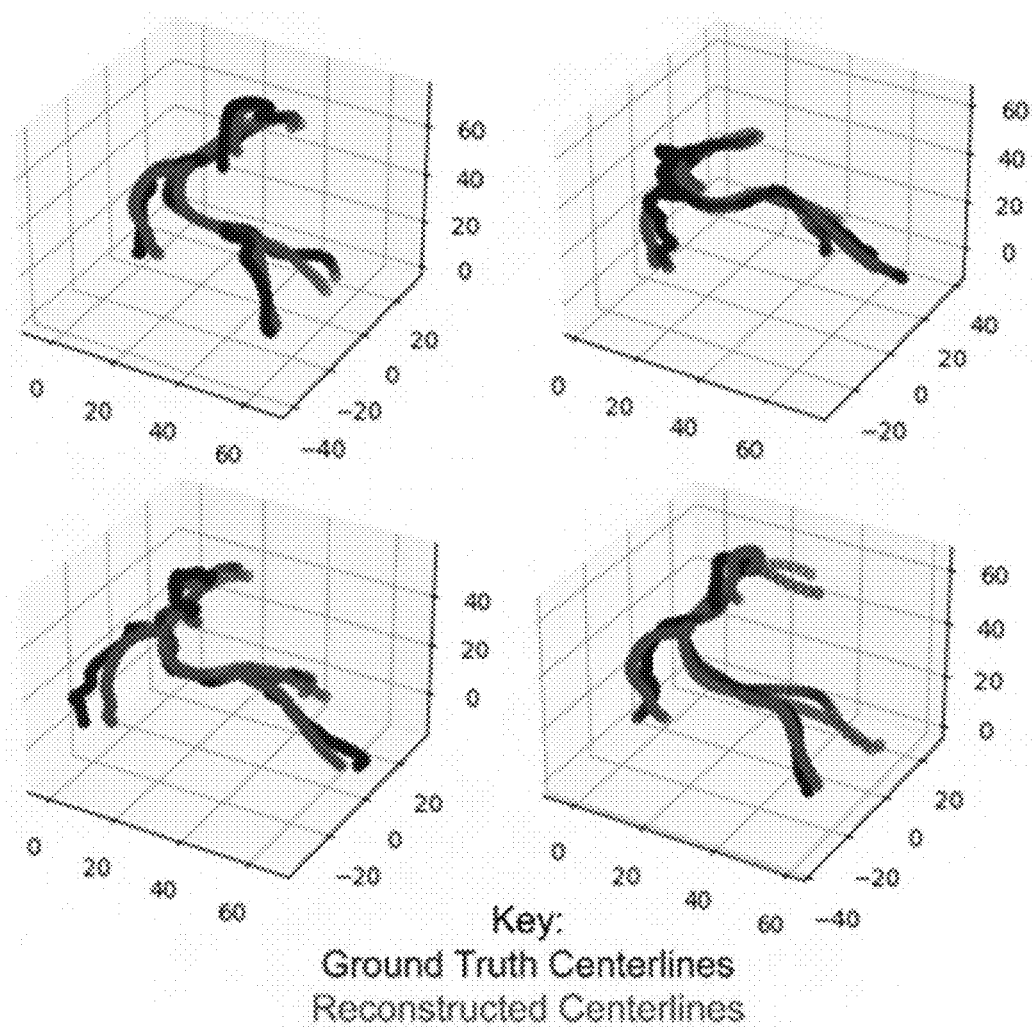
FIG. 11 shows several examples of reconstructed coronary tree centerlines and corresponding ground truth centerlines from synthetic trees, in accordance with an example.

The accuracy of the proposed method for coronary tree reconstruction was analyzed using the validation set of 500 synthetic coronary trees discussed previously with respect to the synthetic vessel tree, and binarized image generation. FIG. 11 shows several examples of reconstructed coronary tree centerlines (red) and their corresponding ground truth (blue). It is observed that the neural network learned the mean centerline path of each vessel in the tree; however, as in the single vessel case, the predicted vessels were not as tortuous as the ground truth centerlines. The RMSE between the ground truth and predicted centerline points in the validation set was 2.57±0.78 mm. The MAE in vessel length was 8.83±4.81 mm. Optimal values for vessel length reconstruction were obtained with a regularization length parameter $\lambda=0.1$ (see Eq. 2), which led to a 47% decrease in vessel length error (16.36±2.88 mm) compared to the same network trained without length regularization in the loss function. Larger values of $\lambda$ resulted in over-constraining the vessel length and inaccurate paths for the different branches, whereas smaller values of $\lambda$ resulted in weaker enforcement of the vessel length.

Figure 12:
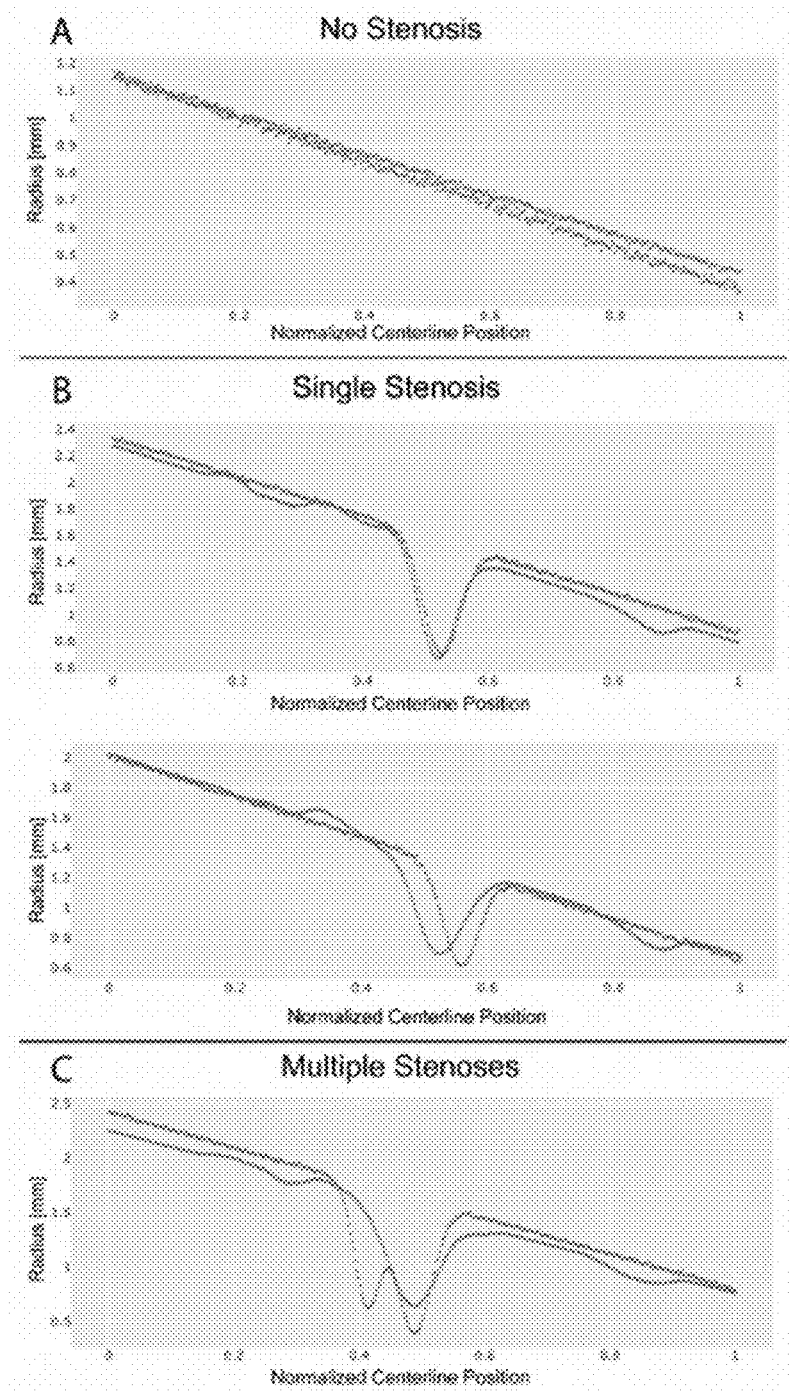
FIG. 12 shows examples of radius reconstruction along normalized centerline position of main right coronary arterial vessels without stenosis, a single stenosis, and a two stenoses, in accordance with an example.

The error in vessel radius along the centerline was then considered for all 2,000 branches. The RMSE of the vessel radius was 0.16±0.07 mm, which corresponds to sub-pixel resolution. The error in radius was larger when comparing minimum stenosis diameter (MAE=0.27±0.18 mm), particularly for severe stenoses greater than 70% diameter reduction, consistent with the behavior reported for single vessel reconstruction in the projection based reconstruction comparison. FIG. 12 shows examples of radius reconstruction (red dots) along normalized centerline position of the main RCA (blue) in vessels without stenosis (top panel), two cases of a single stenosis (mid panel), and a case with two stenoses (bottom panel). Panel A of FIG. 12 demonstrates that the neural network accurately captured the tapering of the vessel along its length. Panel B shows that the neural network accurately predicted the severity and location of the stenosis, although with some oscillations apparent in regions outside the stenosis, or a slight shift in the stenosis location. Panel C shows that the neural network approximates serial stenoses as a single, longer stenosis with an error of 0.3 mm in stenosis severity. Some oscillations remain apparent in the region outside the stenosis.

In the previous examples, the performance of the multi-stage neural network to reconstruct centerline and radius of vessels in coronary artery trees was compared to other reconstruction methods, as well as evaluated for accuracy. Considered below is a functional assessment of vessel disease using the 3D reconstruction of vessel trees using the neural network ML Model. To evaluate the performance of the 3D reconstructions in assessing vessel disease, the physics of blood flow and pressure in the reconstructed coronary trees using computational fluid dynamics (CFD) simulations was used, and the results were compared against known ground truth CFD data. Specifically, distributions of pressure down the RCA vessel in ground truth coronary trees (known synthetic geometries) and their reconstructions was compared to evaluate overall performance as a diagnostic method. The pressure field was used as the basis to calculate well-established functional metrics of CAD such as FFR, iFR, and QFR.

Figure 13:
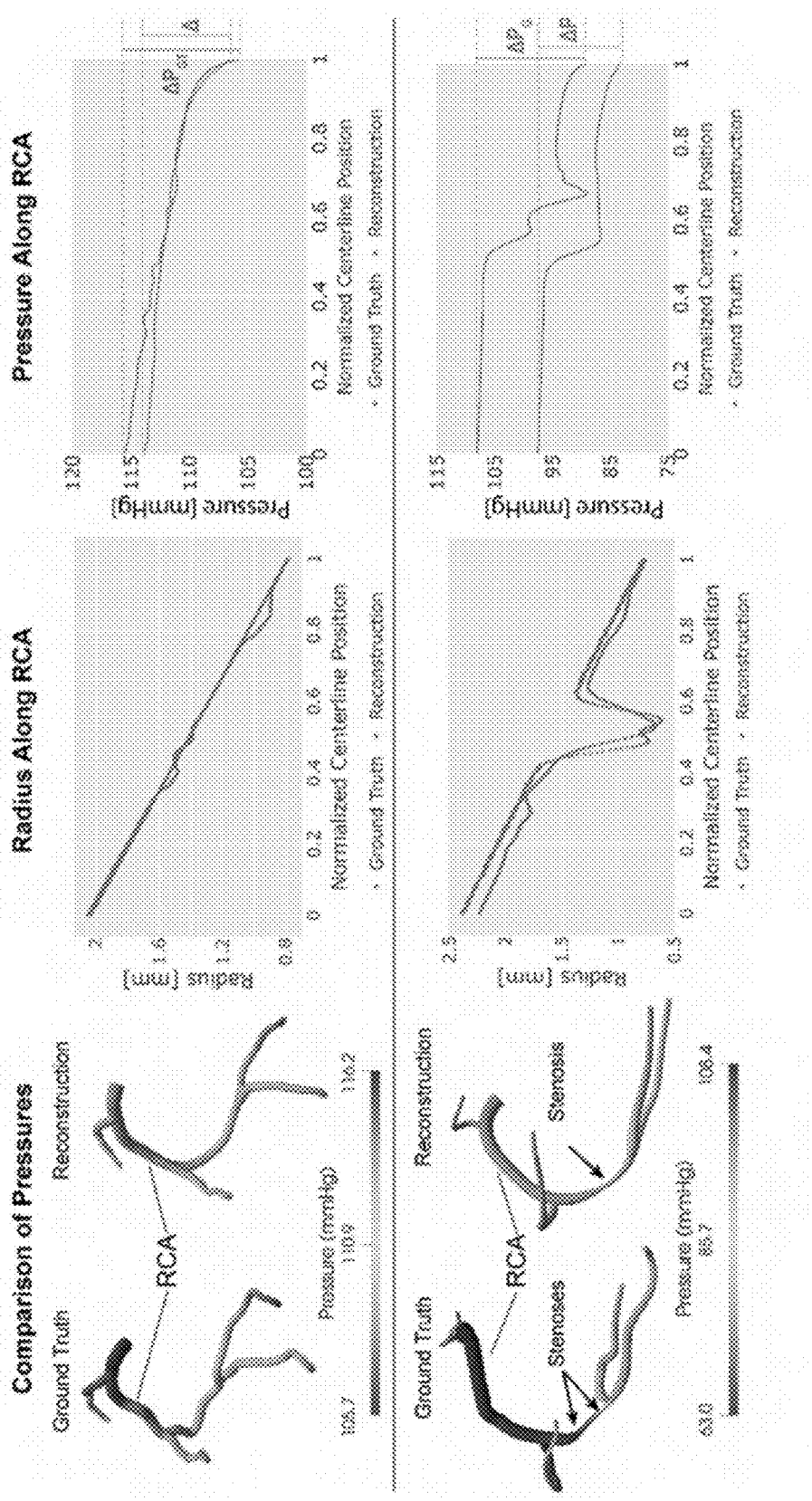
FIG. 13 summarizes the results of ground truth and reconstructed coronary artery tree pressures, in accordance with an example.

CFD simulations with consistent inflow and outflow boundary conditions were run using the validated open-source software CRIMSON. Two examples were considered: 1) a healthy coronary tree without stenosis, and 2) a diseased tree with one stenosis. FIG. 13 summarizes the results of the ground truth and reconstructed coronary artery tree pressures. Results for the healthy coronary tree are given in the top panel of FIG. 13. The left column depicts solution maps of pressure calculated via CFD analysis for ground truth and reconstructed geometries. The center and right columns show the radius and pressure, respectively, versus normalized centerline position in the ground truth (blue) and reconstructed (red) geometries. In the top panel, there is no stenosis and the changes in pressure down the RCA are small. The pressure gradients over the ground truth and reconstructed RCA vessels are DPGT=9.8 mmHg and DPR=8.4 mmHg, resulting in a difference between pressure gradient estimates of $\Delta P=\Delta P_{GT} \Delta P_R=1.4$ mmHg (or only 1.2% of the ground truth inflow pressure).

In the diseased coronary tree, the pressure gradients over the ground truth and reconstructed RCA vessels are DPGT=18.8 mmHg and DPR=14.3 mmHg, resulting in an error of $\Delta P=4.5$ mmHg. Additionally the pressures in the reconstructed geometry were approximately 10 mmHg lower than the pressures in the ground truth. This is due to the differences in reconstructed radius in the proximal portion of the vessel, as well as the decreased tortuosity (and therefore decreased resistance) of the reconstructed coronary tree compared to the ground truth.

The larger pressure error in the stenosis case compared to the healthy case can be attributed to the radius reconstruction error at the stenosis. Given a vessel with radius $\alpha$, its resistance R is inversely proportional to its radius to the power of four ($R \sim 1/\alpha 4$). Thus, relatively small errors in radius reconstruction have substantial impacts on vessel resistance and therefore pressure drop across the vessel. The ground truth stenotic geometry had serial 51% and 57% stenoses. However, the neural network approximated these 2 stenoses as a single, longer, 53% stenosis, corresponding to a radius error of 0.07 mm (see center column FIG. 13). The ratio of pressures on either side of the stenosis (a surrogate of FFR), was 0.886 in the ground truth and 0.895 in the reconstructed vessel. Therefore, despite the 10 mmHg difference in inlet pressure, there was only a 1% error in the clinical quantity of interest.

As described above, the presented 3D reconstruction multi-stage neural network ML Model can accurately reconstruct vessel trees from sets of uncalibrated X-ray angiography images, with sub-pixel resolution of vessel radius. The disclosed methods and systems have demonstrated that reconstruction error is at an acceptable level to accurately model hemodynamic quantities such as pressure gradients across a vessel. Additionally, the proposed methods outperforming other existing reconstruction methods such as using a single-layer ML model, and projection based reconstructions.

ADDITIONAL ASPECTS

Aspect 1. A computer-implemented method for training a vessel tree reconstruction system, the method comprising: selecting a set of three or more binary angiography images corresponding to three or more different projection angles for each synthetic vessel tree of a set of synthetic vessel trees; applying a Euclidean distance transform encoding a two-dimensional (2D) diameter of each branch to the binary angiography images and generating Euclidean distance transformed angiography images; and training, based on the set of Euclidean distance transformed angiography images, a 3D vessel tree reconstruction machine learning model capable of reconstructing 3D vessels, wherein the training of the 3D vessel tree reconstruction machine learning model includes a multi-stage convolutional neural network comprising a multi-stage architecture with (i) a vessel centerline stage, and (ii) a radius reconstruction stage.

Aspect 2. The computer-implemented method of Aspect 1, wherein the 3D vessel tree reconstruction machine learning model is a multi-stage convolutional neural network having a three-stage architecture with (i) a first stage including a classification convolutional neural network backbone, (ii) second stage, being the centerline stage, including a multilayer perceptron (MLP) with ReLU activation and batch normalization between layers of the MLP for centerline reconstruction, (iii) a third stage, being the radius reconstruction stage, including a MLP with ReLU activation and batch normalization between layers of the MLP for radius reconstruction, with an output of the second stage including a $M\_i \times N\_i \times 3$ matrix, with the 3 representing the number of dimensions of the centerline coordinates in cartesian coordinates for each point Ni for each branch Mi, of each 3D vessel tree i; and wherein the third stage is performed for each branch Mi and the output of the third stage is an Ni*1 matrix of radii for each point Ni of each centerline.

Aspect 3. The computer-implemented method of Aspect 1, further comprising: generating a set of synthetic vessel trees, each synthetic vessel tree i represented by a tree matrix $M\_i \times N\_i \times 4$, where Mi is a number of branches in the synthetic vessel tree i with each branch having a branch centerline, Ni is a number of points on each branch centerline, and 4 is the dimension of the data encoded in each point of the branch centerline, including three spatial dimensional coordinates and a radius; generating, from the $M\_i \times N\_i \times 4$ structure, a three-dimensional (3D) volume including a coronary vessel tree comprising Mi branches; and generating, from each synthetic vessel tree, the set of binary angiography images by cone-beam projecting each respective synthetic vessel tree using a plurality of projection angles.

Aspect 4. The computer-implemented method of Aspect 3, further comprising generating the set of synthetic vessel trees for both a left coronary artery tree (LCA) and right coronary artery tree (RCA), each consisting of an arbitrary number of branches.

Aspect 5. The computer-implemented method of Aspect 3, wherein generating the set of synthetic vessel trees comprises: obtaining 3D medical imaging data (such as 3D Computed Tomography Angiography (CTA) or 3D Magnetic Resonance Angiography (MRA)) of a coronary vessel tree of a subject; identifying branch centerlines from the 3D medical imaging data; and producing for each branch centerline a statistical distribution of control points and corresponding standard deviations in three-dimensional space.

Aspect 6. The computer-implemented method of Aspect 5, comprising randomly generating for each branch centerline (i) the length of the centerline; (ii) a distribution of centerline control points, (iii) a most proximal radius of each branch centerline, and (iv) a radius tapering factor across the length of the branch.

Aspect 7. The computer-implemented method of Aspect 5, comprising imposing one or more stenosis profiles to one or more branches of each synthetic vessel tree.

Aspect 8. The computer-implemented method of Aspect 7, wherein the one or more stenosis profiles comprises a certain analytical profile, such as Gaussian or sinusoidal profile.

Aspect 9. The computer-implemented method of Aspect 7, wherein each of the one or more stenosis profiles comprises at least one of parametric stenosis position data, stenosis severity data, and stenosis length data.

Aspect 10. The computer-implemented method of Aspect 5, further comprising generating a 3D volume including the coronary vessel tree by a lofting of contours having a radius, r, for each point, Ni, of each branch, Mi, of the vessel tree, defining an analytical surface representation of the boundaries of each coronary vessel tree.

Aspect 11. The computer-implemented method of Aspect 2, further including utilizing loss functions for training the multi-stage convolutional neural network, wherein the loss functions include one or more of mean square errors between data associated with the set of vessel trees and reconstructed vessel trees including one or more of data on vessel tree length, diameters, vessel tortuosity, and stenosis patterns, and further including regularization terms to prioritize certain features of the trees, including without limitation vessel tree length, diameters, vessel tortuosity, and stenosis patterns.

Aspect 12. The computer-implemented method of Aspect 2, wherein the classification convolutional neural network backbone used to train the first stage is also used to train at least one of the second stage MLP and third stage MLP.

Aspect 13. The computer-implemented method of Aspect 2, wherein each MLP is trained independently from each other, and each stage is trained independently.

Aspect 14. A method of performing 3D vessel tree reconstruction comprising: providing segmented binary angiography images to a preprocessing module; applying, by the preprocessing module, a Euclidean distance transform encoding a two-dimensional (2D) diameter of each branch to the binary angiography images and generating Euclidean distance transformed angiography images; feeding the set of Euclidean distance transformed angiography images to a trained 3D vessel tree reconstruction machine learning model capable of reconstructing 3D vessels, wherein the trained 3D vessel tree reconstruction machine learning model includes a multi-stage convolutional neural network comprising a multi-stage architecture with (i) a vessel centerline stage, and (ii) a radius reconstruction stage.

Aspect 15. The method of Aspect 14, wherein the data set indicative of the 3D reconstruction of the vessel tree comprises a $M\_i \times N\_i \times 4$ matrix, where Mi is a number of branches in the vessel tree i with each branch having a branch centerline, Ni is a number of points on each branch centerline, and 4 is the dimension of the data encoded in each point of the branch centerline, specifically including three spatial dimensional coordinates and a radius.

Aspect 16. The method of Aspect 14, wherein the trained machine learning model is a multi-stage convolutional neural network having a three-stage architecture with (i) a first stage including a classification convolutional neural network backbone, (ii) second stage, being the centerline stage, including a multilayer perceptron (MLP) with ReLU activation and batch normalization between layers of the MLP for centerline reconstruction, (iii) a third stage, being the radius reconstruction stage, including a MLP with ReLU activation and batch normalization between layers of the MLP for radius reconstruction, with an output of the second stage including a M_i×N_i×3 matrix, with the 3 representing the number of dimensions of the centerline coordinates in cartesian coordinates for each point Ni for each branch Mi, and wherein the third stage is performed for each branch and the output of the third stage is an Ni*1 matrix of radii for each point of each centerline.

Aspect 17. The method of Aspect 14, further comprising generating a low-fidelity vessel tree representation including a vessel tree i represented by a tree matrix M_i×N_i×4, where Mi is a number of branches in the vessel tree i with each branch having a branch centerline, Ni is a number of points on each branch centerline, and 4 is the dimension of the data encoded in each point of the branch centerline, including three spatial dimensional coordinates and a radius.

Aspect 18. The method of Aspect 17, further comprising generating, from the M_i×N_i×4 structure, a high-fidelity vessel tree representation including a three-dimensional (3D) volume including a coronary vessel tree comprising Mi branches.

Aspect 19. The method of Aspect 18, further comprising generating the 3D volume by performing a 2D surface spline between the outer radii of adjacent points of each branch centerline.

Aspect 20. The method of Aspect 18, further comprising: identifying a vessel inspection region of the vessel tree; and determining, from the low-fidelity vessel tree representation or from the high-fidelity vessel tree representation, a state of vessel occlusion for the one or more vessels within the vessel inspection region.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the target matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion such as a Contrast Agent Injection System shown in FIG. 2) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding; and no unnecessary limitations should be understood therefrom, as modifications within the scope of the invention may be apparent to those having ordinary skill in the art.

What is claimed:

1. A computer-implemented method for training a vessel tree reconstruction system, the method comprising:
   selecting a set of three or more binary angiography images corresponding to three or more different projection angles for each synthetic vessel tree of a set of synthetic vessel trees;
   applying a Euclidean distance transform encoding a two-dimensional (2D) diameter of each branch to the binary angiography images and generating Euclidean distance transformed angiography images; and
   training, based on the set of Euclidean distance transformed angiography images, a 3D vessel tree reconstruction machine learning model capable of reconstructing 3D vessels, wherein the training of the 3D vessel tree reconstruction machine learning model includes a multi-stage convolutional neural network comprising a multi-stage architecture with (i) a vessel centerline stage, and (ii) a radius reconstruction stage.

2. The computer-implemented method of claim 1, wherein the 3D vessel tree reconstruction machine learning model is a multi-stage convolutional neural network having a three-stage architecture with (i) a first stage including a classification convolutional neural network backbone, (ii) second stage, being the centerline stage, including a multi-layer perceptron (MLP) with ReLU activation and batch normalization between layers of the MLP for centerline reconstruction, (iii) a third stage, being the radius reconstruction stage, including a MLP with ReLU activation and batch normalization between layers of the MLP for radius reconstruction, with an output of the second stage including a $M_i \times N_i \times 3$ matrix, with the 3 representing the number of dimensions of the centerline coordinates in cartesian coordinates for each point $N_i$ for each branch $M_i$, of each 3D vessel tree i; and wherein the third stage is performed for each branch $M_i$ and the output of the third stage is an $N_i * 1$ matrix of radii for each point $N_i$ of each centerline.

3. The computer-implemented method of claim 1, further comprising:
   generating a set of synthetic vessel trees, each synthetic vessel tree i represented by a tree matrix $M_i \times N_i \times 4$, where $M_i$ is a number of branches in the synthetic vessel tree i with each branch having a branch centerline, $N_i$ is a number of points on each branch centerline, and 4 is the dimension of the data encoded in each point of the branch centerline, including three spatial dimensional coordinates and a radius;
   generating, from the $M_i \times N_i \times 4$ structure, a three-dimensional (3D) volume including a coronary vessel tree comprising $M_i$ branches; and
   generating, from each synthetic vessel tree, the set of binary angiography images by cone-beam projecting each respective synthetic vessel tree using a plurality of projection angles.

4. The computer-implemented method of claim 3, further comprising generating the set of synthetic vessel trees for both a left coronary artery tree (LCA) and right coronary artery tree (RCA), each consisting of an arbitrary number of branches.

5. The computer-implemented method of claim 3, wherein generating the set of synthetic vessel trees comprises:
   obtaining 3D medical imaging data of a coronary vessel tree of a subject;
   identifying branch centerlines from the 3D medical imaging data; and
   producing for each branch centerline a statistical distribution of control points and corresponding standard deviations in three-dimensional space.

6. The computer-implemented method of claim 5, comprising randomly generating for each branch centerline (i) the length of the centerline; (ii) a distribution of centerline control points, (iii) a most proximal radius of each branch centerline, and (iv) a radius tapering factor across the length of the branch.

7. The computer-implemented method of claim 5, comprising imposing one or more stenosis profiles to one or more branches of each synthetic vessel tree.

8. The computer-implemented method of claim 7, wherein the one or more stenosis profiles comprises a certain analytical profile, such as Gaussian or sinusoidal profile.

9. The computer-implemented method of claim 7, wherein each of the one or more stenosis profiles comprises at least one of parametric stenosis position data, stenosis severity data, and stenosis length data.

10. The computer-implemented method of claim 5, further comprising generating a 3D volume including the coronary vessel tree by a lofting of contours having a radius, r, for each point, $N_i$, of each branch, $M_i$, of the vessel tree, defining an analytical surface representation of the boundaries of each coronary vessel tree.

11. The computer-implemented method of claim 2, further including utilizing loss functions for training the multi-stage convolutional neural network, wherein the loss functions include one or more of mean square errors between data associated with the set of vessel trees and reconstructed vessel trees including one or more of data on vessel tree length, diameters, vessel tortuosity, and stenosis patterns, and further including regularization terms to prioritize certain features of the trees, including without limitation vessel tree length, diameters, vessel tortuosity, and stenosis patterns.

12. The computer-implemented method of claim 2, wherein the classification convolutional neural network backbone used to train the first stage is also used to train at least one of the second stage MLP and third stage MLP.

13. The computer-implemented method of claim 2, wherein each MLP is trained independently from each other, and each stage is trained independently.

14. A method of performing 3D vessel tree reconstruction comprising:
providing segmented binary angiography images to a preprocessing module;
applying, by the preprocessing module, a Euclidean distance transform encoding a two-dimensional (2D) diameter of each branch to the binary angiography images and generating Euclidean distance transformed angiography images; and
feeding the Euclidean distance transformed angiography images to a trained 3D vessel tree reconstruction machine learning model capable of reconstructing 3D vessels, wherein the trained 3D vessel tree reconstruction machine learning model includes a multi-stage convolutional neural network comprising a multi-stage architecture with (i) a vessel centerline stage, and (ii) a radius reconstruction stage.

15. The method of claim 14, wherein a data set indicative of the 3D reconstruction of the vessel tree comprises a $M_i \times N_i \times 4$ matrix, where $M_i$ is a number of branches in the vessel tree i with each branch having a branch centerline, $N_i$ is a number of points on each branch centerline, and 4 is the dimension of the data encoded in each point of the branch centerline, specifically including three spatial dimensional coordinates and a radius.

16. The method of claim 14, wherein the trained machine learning model is a multi-stage convolutional neural network having a three-stage architecture with (i) a first stage including a classification convolutional neural network backbone, (ii) second stage, being the centerline stage, including a multilayer perceptron (MLP) with ReLU activation and batch normalization between layers of the MLP for centerline reconstruction, (iii) a third stage, being the radius reconstruction stage, including a MLP with ReLU activation and batch normalization between layers of the MLP for radius reconstruction, with an output of the second stage including a $M_i \times N_i \times 3$ matrix, with the 3 representing the number of dimensions of the centerline coordinates in cartesian coordinates for each point $N_i$ for each branch $M_i$, and wherein the third stage is performed for each branch and the output of the third stage is an $N_i*1$ matrix of radii for each point of each centerline.

17. The method of claim 14, further comprising generating a low-fidelity vessel tree representation including a vessel tree i represented by a tree matrix $M_i \times N_i \times 4$, where $M_i$ is a number of branches in the vessel tree i with each branch having a branch centerline, $N_i$ is a number of points on each branch centerline, and 4 is the dimension of the data encoded in each point of the branch centerline, including three spatial dimensional coordinates and a radius.

18. The method of claim 17, further comprising generating, from the $M_i \times N_i \times 4$ structure, a high-fidelity vessel tree representation including a three-dimensional (3D) volume including a coronary vessel tree comprising Mi branches.

19. The method of claim 18, further comprising generating the 3D volume by performing a 2D surface spline between the outer radii of adjacent points of each branch centerline.

20. The method of claim 18, further comprising:
identifying a vessel inspection region of the vessel tree; and
determining, from the low-fidelity vessel tree representation or from the high-fidelity vessel tree representation, a state of vessel occlusion for the one or more vessels within the vessel inspection region.

* * * * *